United States Patent [19]

Kyle et al.

[11] Patent Number: 5,285,392
[45] Date of Patent: Feb. 8, 1994

[54] PARALLEL MANUFACTURING SYSTEM

[75] Inventors: Donald W. Kyle, Mansfield; Alan Bernstein, Moreland Hills, both of Ohio; Karen E. Ammon, Downers Grove, Ill.

[73] Assignee: McKinsey & Company, Inc., New York, N.Y.

[21] Appl. No.: 799,362

[22] Filed: Nov. 27, 1991

[51] Int. Cl.⁵ .................... G06F 15/46; G06F 15/16
[52] U.S. Cl. .................... 364/468; 364/133; 364/231.9; 364/931.41; 364/DIG. 1; 364/DIG. 2
[58] Field of Search ........ 364/131, 133, 134, 401–403, 364/468–473, DIG. 1, DIG. 2

[56] References Cited

U.S. PATENT DOCUMENTS

| | | | |
|---|---|---|---|
| 4,459,663 | 7/1984 | Dye | 364/200 |
| 4,646,238 | 2/1987 | Carlson, Jr. et al. | 364/403 |
| 4,796,194 | 1/1989 | Atherton | 364/468 |
| 4,827,423 | 5/1989 | Beasley et al. | 364/468 |
| 4,864,507 | 9/1989 | Ebling et al. | 364/468 |
| 4,866,628 | 9/1989 | Natarajan | 364/468 |
| 4,887,218 | 12/1989 | Natarajan | 364/468 |
| 4,888,692 | 12/1989 | Gupta et al. | 364/402 |
| 4,924,385 | 5/1990 | Dote | |
| 5,040,123 | 8/1991 | Barber et al. | 364/468 |
| 5,172,313 | 12/1992 | Schumacher | 364/401 |

OTHER PUBLICATIONS

An article entitled "Considerations in Choosing Shop Scheduling Algorithms" by Blackburn, Jr., *Production and Inventory Management*, 4th Qtr. 1984, pp. 107–124.
An article entitled "A Crane Scheduling Problem in a Computer-Integrated Manufacturing Environment" by Matsuo, et al., *Management Science*, vol. 37, No. 5, May 1991, pp. 587–606.
An article entitled "Finite Scheduling It Works If..." by Connor, *Manufacturing Systems*, Aug. 1987, pp. 39–40.
An article entitled "Finite Scheduling—Round Two" by Greene, *The Magazine of Manufacturing Performance*, Feb. 1989, pp. 24 & 27.
An article entitled "History of Computer Use in Manufacturing Shows Major Need Now is for Integration" by Sadowski, *IE*, Mar. 1984, pp. 34–42.
An article entitled "IPSS: An Approach Towards Automated Decisions in CIM Systems" by Sepulveda, et al., *Computers & Ind. Eng.*, (1987) vol. 13, Nos. 1–4, pp. 11–14.
An article entitled "Medium to Short Term Finite Capacity Scheduling: A Planning Methodology for Capacity Constrained Workshops" by McCarthy, et al., *Eng. Costs and Production Economics*, 19 (1990), pp. 189–199.
An article entitled "Planning Queueing Simulations" by Whitt, *Management Science*, vol. 35, No. 11, Nov. 1989, pp. 1341–1366.
An article entitled "Preaching the Gospel of Finite Scheduling" by Sheridan, *Industry Week*, Aug. 21, 1989, pp. 42–43.
An article entitled "A Production Scheduling Problem in the Glass-Container Industry" by Paul, *Operations Research*, vol. 27, No. 2, Mar.–Apr. 1979, pp. 290–302.
An article entitled "Regenerative Pull (Kanban) Production Control Policies" by Seidmann, *European Journal of Operational Research*, 35 (1988), pp. 401–413.

(List continued on next page.)

*Primary Examiner*—Jerry Smith
*Assistant Examiner*—Steven R. Garland
*Attorney, Agent, or Firm*—Marshall, O'Toole, Gerstein, Murray & Borun

[57] ABSTRACT

A parallel manufacturing system for use in a manufacturing plant that utilizes a massively parallel computer determines the scheduling of all manufacturing operations used in connection with the manufacture of the products made in the plant. The system utilizes an explosion procedure to determine the net requirements for all components used in the manufacturing operations, and then schedules any manufacturing operations necessary to make the required components.

34 Claims, 34 Drawing Sheets

OTHER PUBLICATIONS

An article entitled "A Requirements Planning System for the Space Shuttle Operations Schedule" by Steinberg, et al., *Journal of Operations Management*, vol. 1, No. 2, Nov. 1980, pp. 69-76.

A review by Stefanski of the book "Search in Artificial Intelligence" by Kanal, et al., SIGART Bulletin, vol. 2, No. 4, pp. 193-194, 1988.

An article entitled "Simulation Software Update-Kudos & Caveats" by Jasany, *Automation*, Feb. 1989, pp. 27-29.

An article entitled "A Simulation Study of Sequencing and Maintenance Decisions in a Dynamic Job Shop" by Burton, *Computers Ind. Engng.*, 1989, vol. 17, Nos. 1-4, pp. 447-452.

Technical abstracts of The Robotics Institute of Carnegie Mellon University, *SIGART Bulletin*, vol. 2, No. 4, p. 217, Nov. 1990.

| OPERATION ID # | HOME PROCESSOR | PROCESSOR ENTRY # | # OF COMPONENT RECORDS |
|---|---|---|---|
| 0 | 0 | 1 | 2 |
| 1 | 1 | 1 | 0 |
| 2 | 2 | 1 | 3 |
| 3 | 0 | 2 | 0 |
| 4 | 1 | 2 | 2 |
| 5 | 2 | 2 | 0 |
| 6 | 0 | 3 | 0 |
| 7 | 1 | 3 | 0 |

PROCESSOR # 0

| OPERATION ID # | : 0 |
| HOME PROCESSOR | : 0 |
| PROCESSOR ENTRY # | : 1 |
| # COMPONENT RECS | : 2 |
| NEXT PTR | |

| OPERATION ID # | : 1 |
| HOME PROCESSOR | : 1 |
| PROCESSOR ENTRY # | : 1 |
| # COMPONENT RECS | : 0 |
| NEXT PTR | |

| OPERATION ID # | : 2 |
| HOME PROCESSOR | : 2 |
| PROCESSOR ENTRY # | : 1 |
| # COMPONENT RECS | : 3 |
| NEXT PTR | |

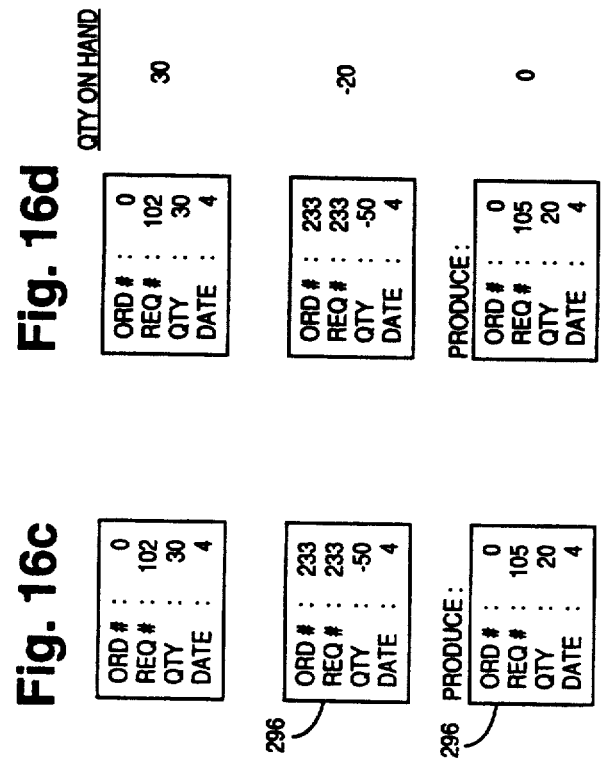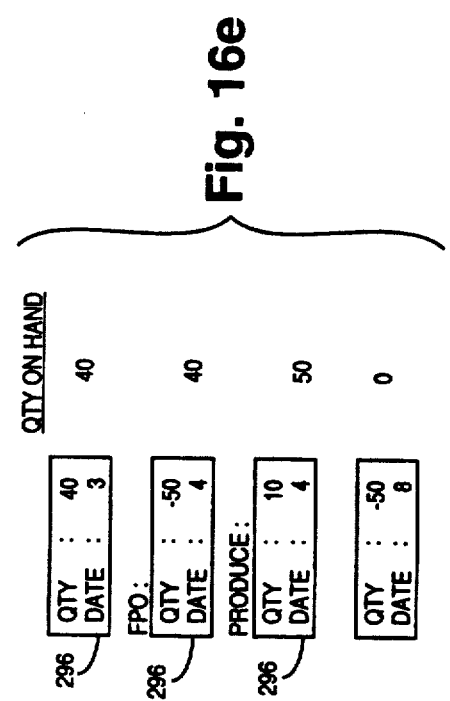

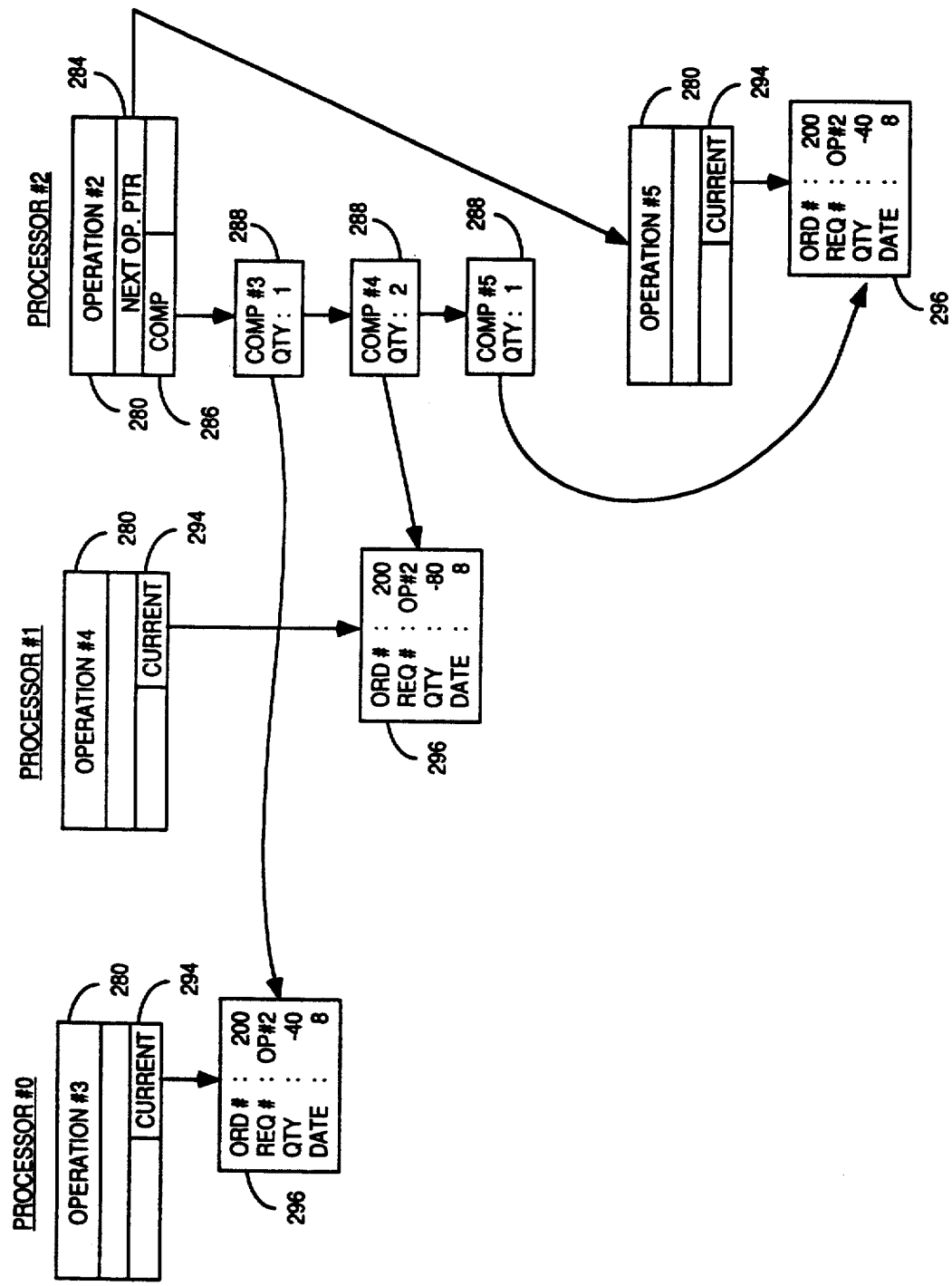

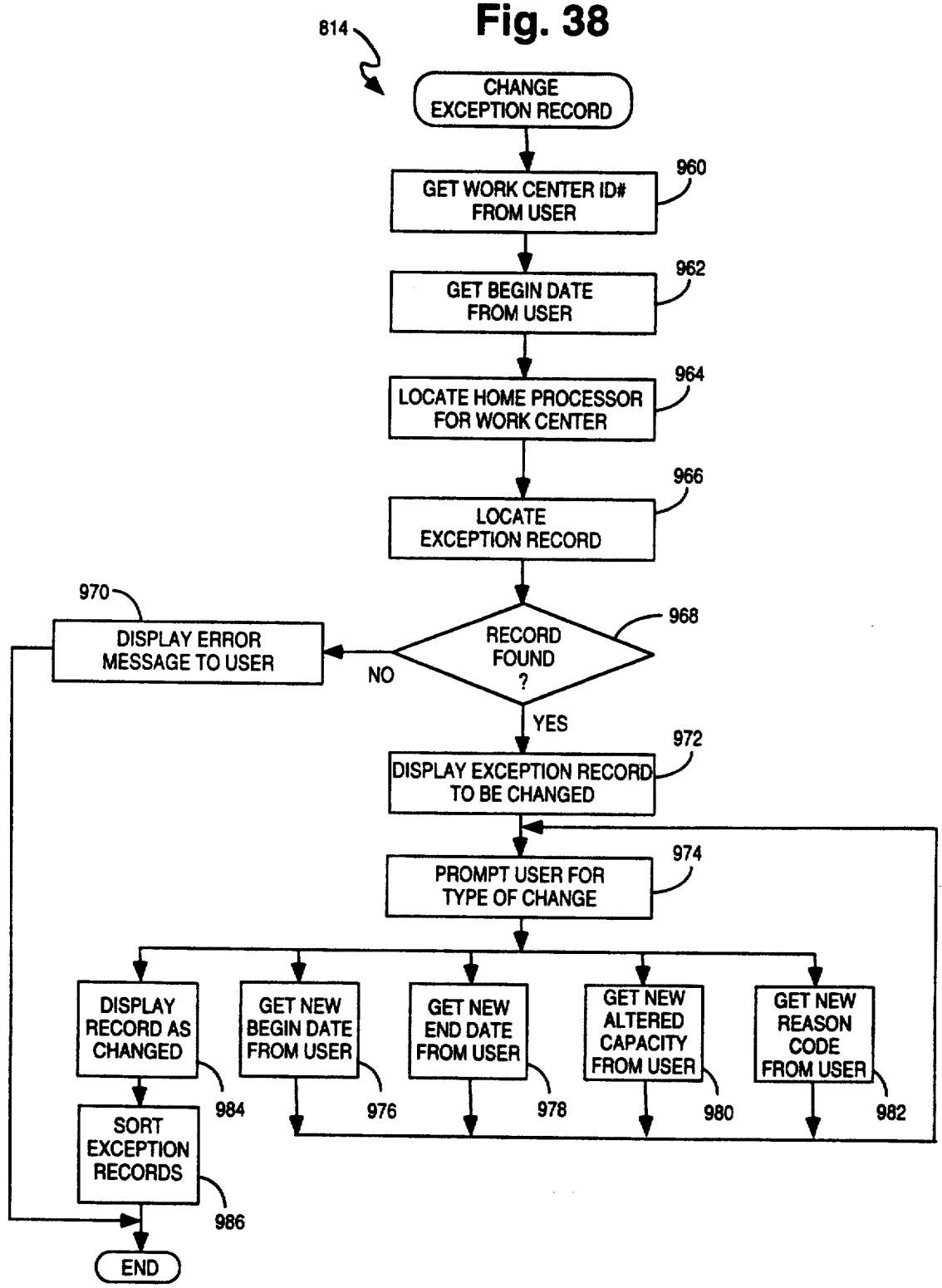

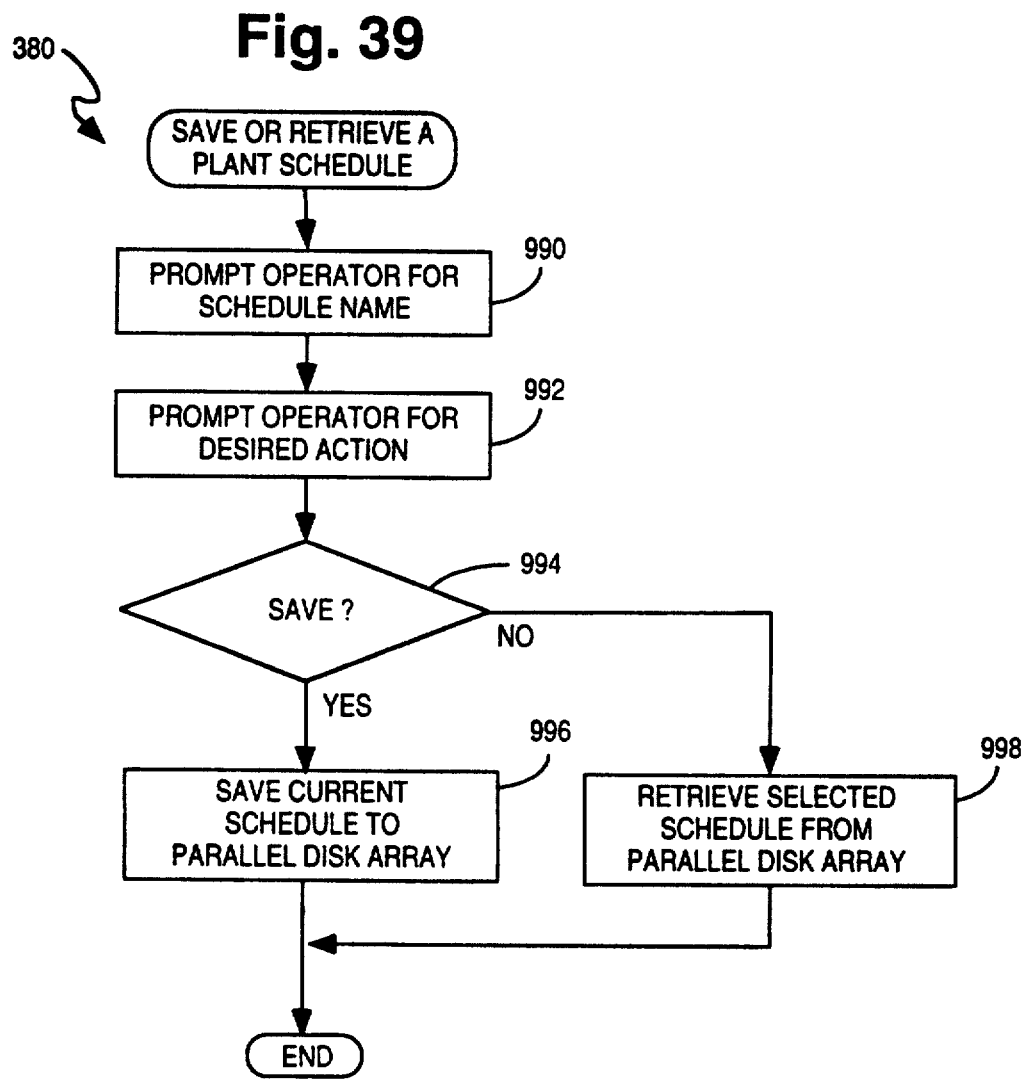

PARALLEL MANUFACTURING SYSTEM

BACKGROUND OF THE INVENTION

The present invention relates to a parallel manufacturing system, for use in a manufacturing plant, that determines when all manufacturing operations which produce the products and components made in the plant should be performed.

In a manufacturing plant in which one or more products are made, such as an automobile assembly plant, it is necessary to schedule manufacturing operations based upon the quantities of the products that are needed and to ensure that all components used in each manufacturing operation are in inventory when that operation is scheduled to begin. Any failure to properly schedule manufacturing operations or to have the necessary components in inventory may result in late manufacture of the product and missed customer deadlines as a result.

The task of scheduling operations and ensuring a sufficient inventory of components for those operations is a complex one, particularly for a large manufacturing plant where thousands of manufacturing operations and thousands of components are used in the manufacture of numerous products. Systems that are used to determine when manufacturing operations should be performed and when components used in those operations should be in inventory are referred to herein as "manufacturing systems."

Conventional manufacturing systems in widespread use utilize a generally standard approach in addressing the above task. Manufacturing systems incorporating this standard approach are referred to herein as "MRP II" systems, and the MRP II approach is described in detail in a book entitled "Material Requirements Planning" by Joseph Orlicky and published by McGraw-Hill.

The general manner in which an MRP II system operates with respect to the manufacture of a product is as follows. The initial step is to determine the "net requirement" of the product by netting customer orders or production forecasts for the product against the current inventory of the product. The net requirements of the product is then used to determine the quantities of the components that are used in the manufacture of the product.

Components typically have different relationships to end product, depending upon when such components are used in the manufacturing process and in what operations they are used. These relationships are typically illustrated with a product tree. The product is at the highest level of the tree; all components used in the final assembly of the product occupy the next lower level in the tree; the subcomponents that are necessary to make each of those components occupy the next lower level in the tree; and so on.

After the net requirements for the product are determined, the net requirements for the components in the next lower level in the product tree are determined. This determination is based on netting the inventory of a particular component against the quantity needed as reflected by the net requirements for the product. There may also be customer orders for the component which must be taken into account. This may occur when a customer orders components used in the repair of the product.

The step of determining the net requirements for the components is again repeated for the next lower level of the product tree. The process continues until the net requirements of all components in the product tree have been determined.

After a conventional MRP II system determines the net requirements for all components needed for the manufacture of a product, the production of the required quantities of components is scheduled based upon a predetermined "lead time" required for the manufacture of each component. The lead time generally corresponds to the time required to manufacture the component, but in practice is lead time is made artificially longer.

The scheduling of the manufacture of a component is based on the lead times of all subcomponents necessary for the manufacture of that component. For example, assume that 40 units of component A must be manufactured on day 10, that component A has three subcomponents A1, A2 and A3, and that each of those subcomponents has a lead time of four days. In this case, the manufacturing operation that produces component A would be scheduled for day 10, and the manufacturing operations that produce subcomponents A1-A3 would be scheduled for day 6 so that they would be completely manufactured and ready for use in the manufacturing operation that produces component A on day 10.

The starting dates for all manufacturing operations are determined based upon the predetermined lead times and results in a rough production schedule for the plant. The production schedule is rough because there are invariably scheduling conflicts, i.e. lack of capacity to perform the manufacturing operations. Plant operators then analyze the rough production schedule and reschedule manufacturing operations in an attempt to minimize the number of conflicts.

The above process of determining the net requirements and generating the rough production schedule is typically carried out by a large mainframe computer. For relatively large manufacturing plants, the mainframe computer may take 15 hours or more to generate a rough production schedule for the plant, due to the large number of components and operations that are used in the manufacture of the products. The rough production schedule is usually generated relatively infrequently, every week for example.

There are a number of fundamental disadvantages in the operation of conventional MRP II systems as described generally above. A primary disadvantage of such systems is the failure to take into account the real-time nature of the manufacturing task. A conventional MRP II system may generate a production schedule once a week. However, during that week, plant operators are continuously rescheduling operations, ordering additional inventory, and making other day-to-day decisions that affect the production schedule. The rescheduling of an operation, in addition to affecting the components made by that operation, also affects the quantity of components consumed during that operation. Thus, a change in one operation in the system may have a relatively complex effect on the production schedule. However, since no schedule changes or other actions are accounted for until the next time the production schedule is generated, the actual day-to-day status of the manufacturing plant is not known.

Another disadvantage of MRP II systems is that lead times are typically exaggerated to ensure that all components are ready when needed. As a result, components are manufactured before they are needed. The effect of exaggerated lead times is multiplied as the MRP II system traverses down the levels of the product tree. For example, if the lead time for each component in a 10-level product tree is exaggerated by two days, the components in the lowest level of the tree will be manufactured 18 days (9 component levels*2 days per level) before they are actually needed. The exaggeration of lead times not only generates undesired excess inventory, it also further divorces the rough production plan from reality.

Conventional MRP II systems also rely on and generate a tremendous amount of unnecessary paperwork that complicates the system, impedes the ability of the system to be updated, and introduces erroneous assumptions into the system, further degrading system performance. Two examples of such paperwork are release orders and allocation orders.

A release order is an order authorizing the performance of a set of manufacturing operations. Theoretically, a release order should be generated for the date the operation is scheduled to begin. However, in practice, release orders are generated in advance of the start date of the operation to allow time for paperwork handling. The disadvantage of generating premature release orders is that it when release orders are generated, the operations affected by those orders are no longer rescheduled. Once a release order has been generated, the manufacturing system considers that order to be in progress and it cannot be rescheduled. The number of orders that cannot be rescheduled increases as the length of time that release orders are generated in advance.

After a release order is generated, an allocation request is used to reserve a quantity of each component in inventory needed for manufacture of the component specified in the release order. Once that quantity of components is allocated to the order, it is no longer considered inventory that can be used for other manufacturing operations.

One problem with allocation is that, typically, hundreds of released orders are generated before all of their components are available; consequently, work on many of the orders cannot proceed due to lack of components. Components reserved for unworkable orders end up preventing other orders from being performed. As a result, this causes sizable inventories to build up and at the same time generates rampant parts shortages.

Another problem with allocation is that the actual quantity produced on an order is very often slightly less than the exact quantity ordered. Thus, when orders are completed, a reconciliation must be made to "unallocate" components. During the time required to do this, inventory balances are incorrect, resulting in flawed material requirements planning.

Conventional MRP II systems generate paperwork when orders are released that includes a printed production order, a picking list and turnaround documents to be used in reporting production. This paperwork is dispensed to work centers by dispatchers. When any change is required in the sequence of production, or if production orders are changed or cancelled, the paperwork must be shuffled. As a result, any significant production change is greatly hampered.

Due to the above factors, such as the exaggeration of lead times, the infrequent generation of the production schedule, and inaccuracies and erroneous assumptions introduced in the paperwork trail, the integrity of the production schedule of a conventional MRP II system is severely degraded.

And when the integrity of the schedule becomes compromised, and plant operators and other personnel realize that the schedule no longer reflects when manufacturing operations must take place to make products to meet customer demands, the production schedule becomes nothing more than a formality, and production scheduling routinely takes place on an emergency, seat-of-the-pants basis.

SUMMARY OF THE INVENTION

The present invention is directed to a parallel manufacturing system incorporating a new approach to production scheduling. Instead of generating production schedules infrequently, such as every two weeks, a parallel manufacturing system in accordance with the invention generates production schedules nearly instantaneously.

In one prototype version of the parallel manufacturing system, a production schedule for 100 products requiring over 65,000 manufacturing operations scheduled during a 365-day period, the total time required for generating the production schedule was approximately two seconds. Because the time required to generate the production schedule is so short, precise and accurate control of the manufacturing plant can occur in real time, and the operator has near-instantaneous access to the exact state of the production schedule at all times.

After a production schedule is generated, the parallel manufacturing system allows the plant operator to inspect the current state of the production schedule via a number of different visual displays. Using these displays and the capability to instantly generate production schedules, the plant operator may fine tune the production schedule by repeatedly making modifications to the schedule and/or the plant capacity and viewing the results of those modifications.

The parallel manufacturing system allows the operator to save and retrieve different production schedules. Thus, the operator can generate an optimum or near-optimum production schedule by making different modifications to the schedule, and saving the modified schedule only if it is better than the previous schedule. If the operator cannot generate a better schedule than a previously saved schedule, the operator can retrieve that schedule for use in the plant.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIGS. 16a-16e illustrate the status of a number of demand/supply records during operation of the system;

FIG. 17 illustrates the creation of a number of demand records, during operation of the system;

FIGS. 31-38 are flowcharts of various steps schematically shown in the modify schedule/capacity routine of FIG. 30; and FIG. 39 is a flowchart of a save/retrieve plant schedule routine schematically shown in FIG. 8b.

DETAILED DESCRIPTION OF A PREFERRED EMBODIMENT

Figure 1:
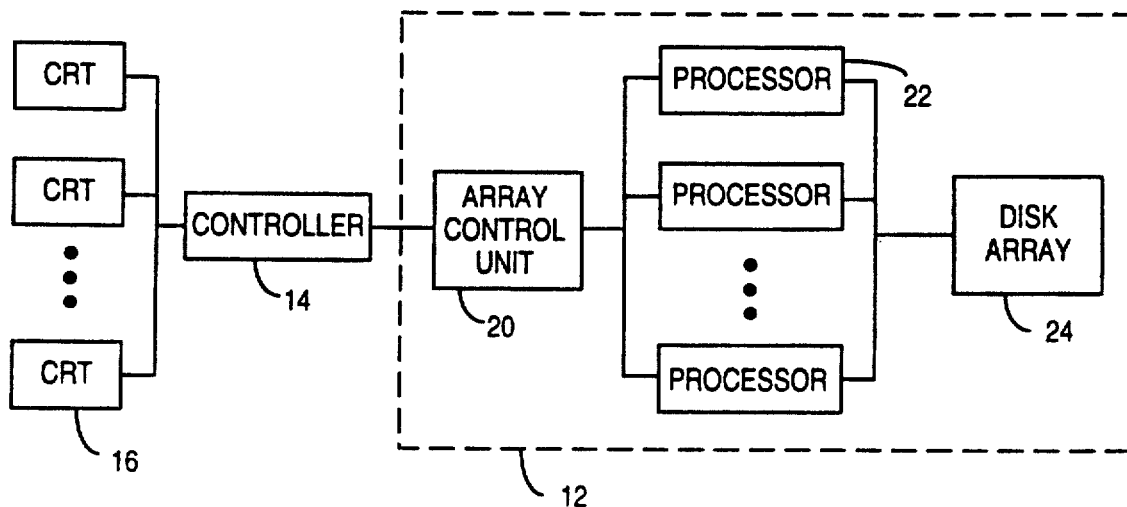
FIG. 1 is a block diagram of the electronics of a preferred embodiment of a parallel manufacturing system in accordance with the invention.

A block diagram of the electronics of a preferred embodiment of a parallel manufacturing system 10 in accordance with the invention is shown in FIG. 1. The parallel manufacturing system includes a massively parallel computer 12, a controller 14 and a plurality of display devices 16, such as cathode-ray tubes (CRTs).

The massively parallel computer 12 includes an array control unit (ACU) 20 and a large number of processors 22. Each of the processors 22 includes a random-access memory (RAM) portion (not shown). The processors 22 are connected to a massively parallel disk array 24 for permanent storage of data generated by the processors 22 and can simultaneously access the disk array 24.

The parallel computer 12 includes at least about 100 parallel processors 22, but preferably a much greater number of processors, such as 4,000 or more. The processors 22 simultaneously execute, in parallel, a single computer program on multiple sets of data, one set of data being stored in each processor 22. This type of operation, which has been previously been used for other applications outside the manufacturing environment, is conventional and is referred to as single-instruction, multiple-data (SIMD) operation.

A different type of operation that has been previously used in parallel computers is multiple-instruction, multiple-data (MIMD) operation. In order to use MIMD operation to execute a computer program, the program must be divided into program segments, each of which is then executed by a different parallel processor in the parallel computer. Although MIMD operation could be used in connection with the present invention, SIMD operation is preferred since there is no need to write separate segments of a computer program for each parallel processor.

The computer program executed by the massively parallel computer 12 is stored in the ACU 20, and the ACU 20 controls the operation of the parallel processors 22. Massively parallel computers suitable for use in the parallel manufacturing system 10 are commercially available from MasPar Corporation.

INTERRELATIONSHIPS OF OPERATIONS AND COMPONENTS

The parallel manufacturing system 10 uses a specially designed relational tree that completely specifies the interrelationships of all manufacturing operations used in the manufacture of each product made in the plant, as well as the relationships between all manufacturing operations and the components or products made as a result of those operations. This relational tree provides more information concerning the relationship between operations, components and products than is typically used by conventional MRP II systems.

Figure 2A:
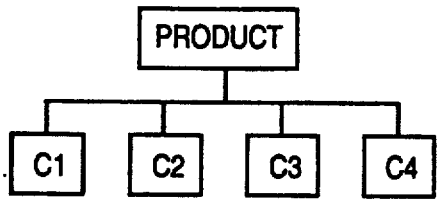

Referring to FIG. 2a, a conventional MRP II system utilizes a product tree that represents a product as a combination of components, an example of which is illustrated in FIG. 2a. The product tree of FIG. 2a illustrates that the product is made from components C1, C2, C3 and C4. The product tree in a conventional MRP II system is generated from the bills of material for the product, each bill of material representing the product/component relationship for one level of the product tree. For the product tree of FIG. 2a, there would be one bill of material since only one tree level is represented.

It should be noted that the bills of material do not provide any information relating to the operations used in the manufacture of the product. In a conventional MRP II system, this information is typically obtained from one or more routing slips that specify the manufacturing operations used. However, the routing slips do not provide the precise interrelationship of all manufacturing operations.

Figure 2B:
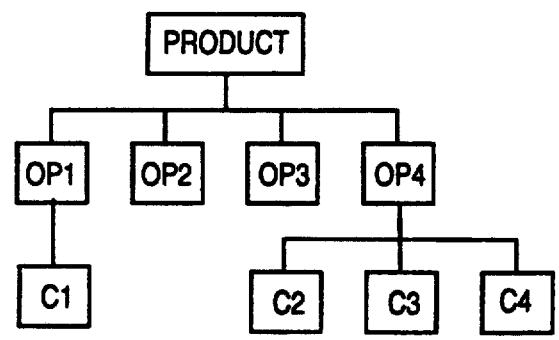

The relational tree of FIG. 2b shows the product tree of FIG. 2a as supplemented by the operation information set forth in the routing slips for the product. The tree of FIG. 2b illustrates that four operations, OP1, OP2, OP3 and OP4, are used in the manufacture of the product, and that component C1 is needed during operation OP1 and components C2-C4 are needed for operation OP4. However, the relational tree set forth in FIG. 2b lacks important information as to how the operations are interrelated.

Figure 2C:
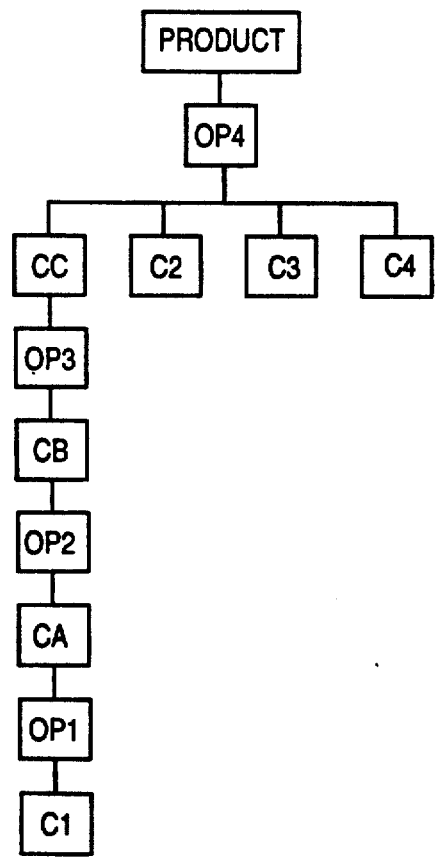

That deficiency is illustrated in FIG. 2c, which illustrates the complete specification of the operation and component interrelationships used in the manufacture of the product. In the tree of FIG. 2c, it should be noted that there are additional "components" shown, CA, CB, and CC, that were not illustrated in the trees of FIGS. 2a and 2b. These "components" correspond to component C1 after it has undergone several operations. For example, assume that OP1 is a sanding operation, that OP2 is a polishing operation, and that OP3 is a painting operation. In a conventional MRP II system, that component is considered to be a single component, C1, despite the fact it has undergone different operations, and has been changed in some way as a result.

In the present invention, by defining that component differently after the completion of different operations, the entire interrelationship between the operations and the components required therein is represented. Thus, the relational tree of FIG. 2c specifies that component CA is needed for operation OP2; that operation OP2 produces component CB, which is required for operation OP3; that operation OP3 produces component CC, which is required for operation OP4. None of that information is represented in the tree of FIG. 2a.

In order to define a relational tree that completely specifies a product, the following information should be included: 1) every operation used in the manufacture of the product; 2) every component produced by every operation (every operation is considered to generate a separate component); and 3) the linking of every component between the operation that produces it and the operation in which it is needed.

A practical result of the use of the relational tree of FIG. 2c is that the parallel manufacturing system 10 can schedule all operations and can determine when all components are necessary for those operations. The manufacturing system 10 can also automatically reschedule operations and component requirements that are affected by changes made with respect to related operations and components.

Because relational trees that completely specify the relationships between operations and components are used, the system 10 has the capability to recognize that if an operation is rescheduled to another time, the components needed in that operation, and all operations necessary to make those components, should also be rescheduled.

For example, referring to the relational tree illustrated in FIG. 3, if the date on which operation #2 is to begin is changed to two days later, components #3, #4 and #5 are not needed until two days later, operation #4 should be rescheduled to two days later, and components #6 and #7 are not needed until two days later. Thus, the entire subtree for a rescheduled operation is also rescheduled.

Other ways in which the parallel manufacturing system 10 takes advantage of the relationship between operations and components will be apparent in view of the detailed description of the operation of the system 10 set forth below.

As used herein, the term "component" is broadly defined to include any resource that is used in connection with a manufacturing operation. For example, a "component" may be a part that is eventually incorporated into the product; it may be a material that is consumed during an operation, such as paint or sandpaper, etc.; or it may be a tool or worker required for the operation.

In operation, the parallel manufacturing system 10 determines, for each product to be manufactured, the quantity of components and the date when that quantity must be manufactured to make the product by the deadline date. This is accomplished by an "explosion" procedure.

Figure 3:
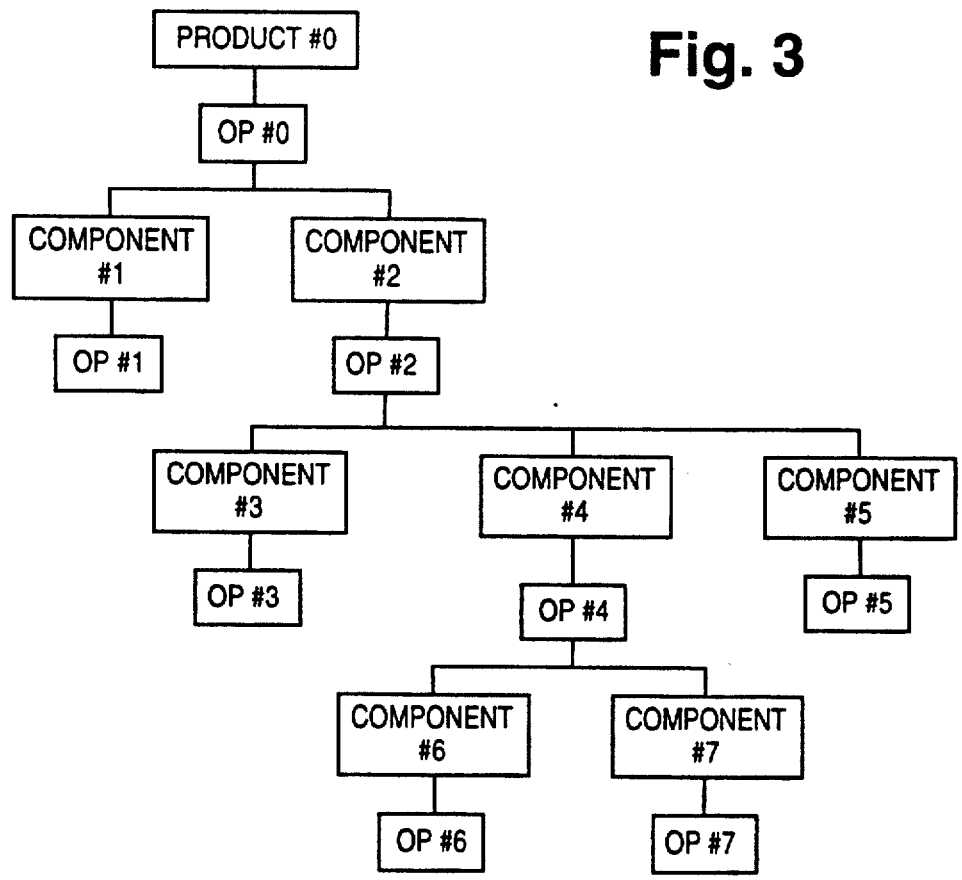
FIGS. 2a-3 show a number of relational trees illustrating the relationship between components and/or operations used in the manufacture of a product.

For the relational tree of FIG. 3, the first step in the explosion procedure would be to determine the quantity of product #0 that must be manufactured by subtracting the quantity of product #0 in inventory from the quantity ordered. That result, or net requirement, is used to set the initial required quantity of components #1 and #2, which are used to make product #0. For example, if the net requirement for product #0 is 200, the initial required quantities of components #1 and #2 are also 200 (assuming that one of each of components #1 and #2 is used in operation #0). Those initial required quantities are then increased if any orders have been received for components #1 or #2 and decreased if any quantities of components #1 or #2 are in inventory. The explosion procedure continues, proceeding down each level of the product tree, until the net requirements for all components used in the manufacture of the product have been determined.

In addition to determining the net requirements of all components of a product, the explosion procedure in accordance with the present invention also determines the exact dates on which all operations must occur in order to meet the date on which that product must be shipped. This determination of the dates of all operations is not performed by conventional MRP II systems.

INITIAL DATA ORGANIZATION IN SYSTEM

To utilize the parallel manufacturing system 10 for a manufacturing plant, data representing the following information must be entered into the system 10: 1) data representing the relational tree for each product made in the manufacturing plant; 2) data representing the manufacturing capacity of the plant; and 3) data representing the supply of and demand for all products and all components used in the manufacture of those products.

Figure 4A:
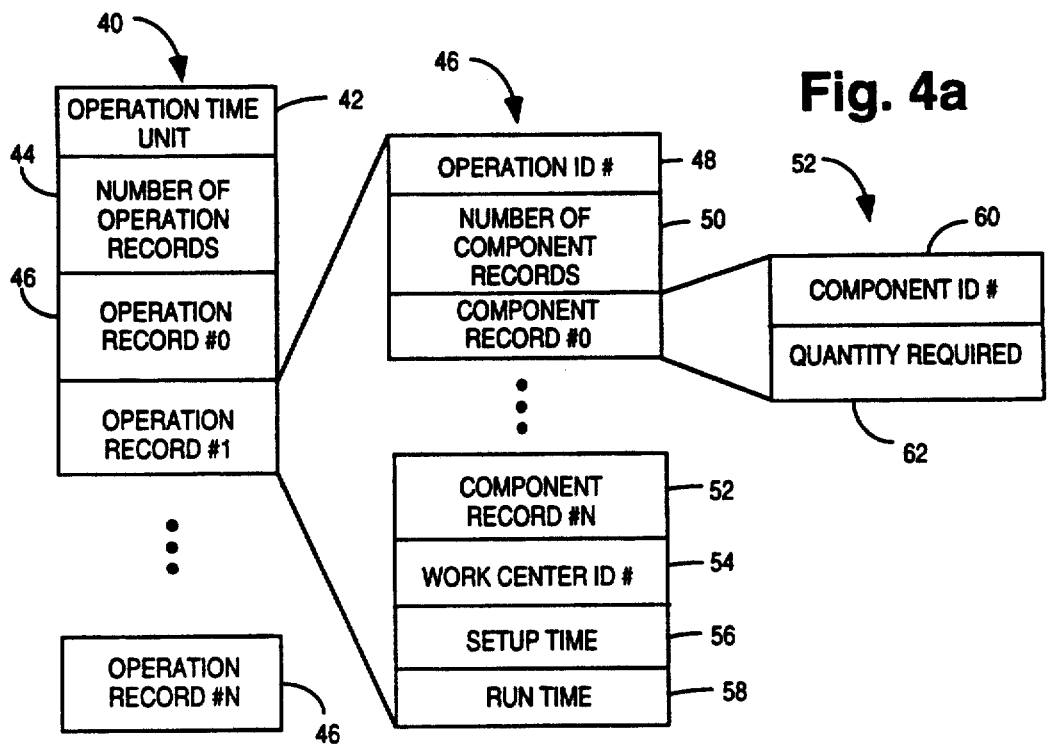
FIGS. 4a -5b illustrate a number of formats in which data are entered into the parallel manufacturing system.

Data representing the relational tree for each product manufactured in the plant is shown in FIG. 4a and is stored in an operation database in a memory (not shown) in the controller 14. The operation database includes a data file 40 representing the relational tree for all of the operations and components used in connection with the manufacture of all of the products manufactured in the plant. Referring to FIG. 4a, the data file 40 includes a number of data fields. A first data field 42 identifies the operation time unit, such as minutes, for the operations necessary to make the product. A data field 44 contains the number of operation records stored in the data file 40. There is one operation record for each operation used in the manufacture of the products; thus, for the simple tree of FIG. 3, there would be seven operation records, assuming that was the only product made in the plant.

Each operation record 46 contains a number of subfields. A subfield 48 contains a unique alphanumeric number identifying the operation. A subfield 50 specifies the number of component records 52 contained in the operation record 46. There is one component record for each component used in the operation; thus, for operation #2 of FIG. 3 the operation record would have three component records, corresponding to components #3, #4 and #5.

Each operation record 46 also includes a subfield 54 identifying the portion of the manufacturing plant, or work center, where that operation is performed. A subfield 56 specifies the amount of time required to set up the work center machine or machines that are used during the operation, and a subfield 58 specifies the amount of time the operation requires to produce a single component. For example, for operation #2 in FIG. 3, subfield 58 would be the time required to produce a single component #2.

Each component record 52 contains a first subfield 60 having an alphanumeric number identifying that component and a number specifying how many of that component are required in the operation. For example, if operation #4 in FIG. 3 required three components #6, the subfield 62 would be three.

Figure 4B:
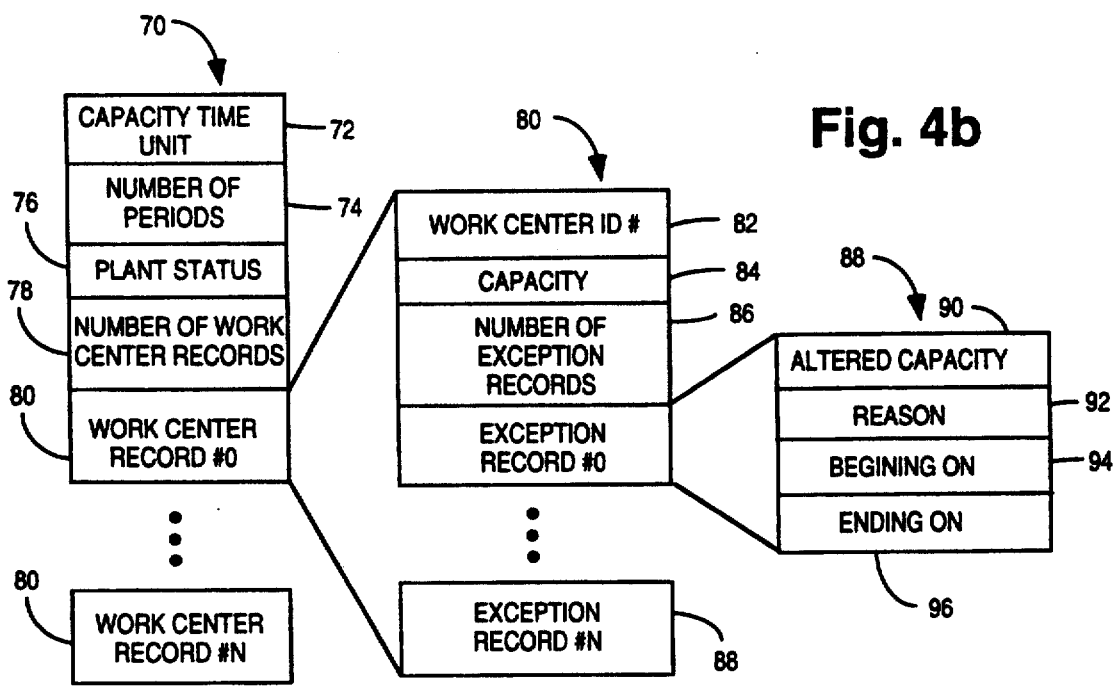

The controller 14 also contains data relating to the manufacturing capacity of the plant in a work center data file 70 shown in FIG. 4. The file 70 includes a data field 72 specifying the capacity time unit used, such as hours or shifts. A field 74 specifies the number of periods for which the system 10 will generate an operation schedule. For example, the system may generate a schedule for 100 eight-hour shift periods.

A data field 76 contains data relating to whether the plant is operating during each period specified by the field 74. Thus, if the plant operates 24 hours per day on weekdays only and if the number of periods specified by field 74 were 100, the data field 76 would contain 100 single-bit binary entries, a logic "1" for each period falling on a weekday to indicate that the plant was operating then and a logic "0" for each period falling on a weekend.

A data field 78 specifies the number of work center capacity records 80 contained in the work center data file 70. One work center capacity record is generated for each work center in the plant. Each work center capacity record 80 has a subfield 82 containing an alphanumeric number to identify the work center and a subfield 84 to specify the normal capacity of the work center. The normal capacity of the work center may be changed by one or more exception records when for example, a work center or portions thereof are not operating due to machine failure or scheduled maintenance, for example. A data field 86 specifies the number of exception records 88, and each exception record 88 includes four subfields. A subfield 90 specifies the altered capacity; a subfield 92 specifies the reason for the altered capacity; a subfield 94 specifies the beginning date or time of the altered capacity; and a subfield 96 specifies the ending date or time of the altered capacity.

Figure 5A:
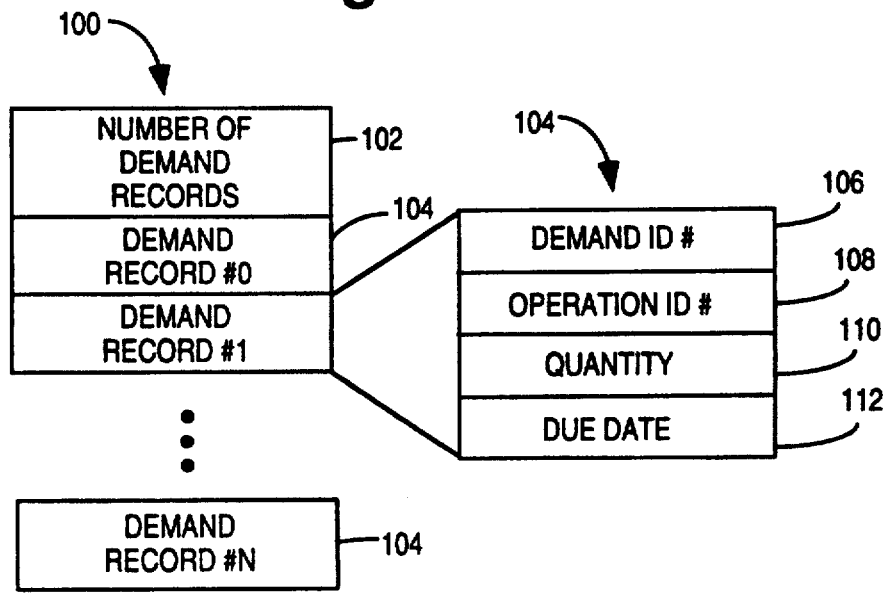
Figure 5B:
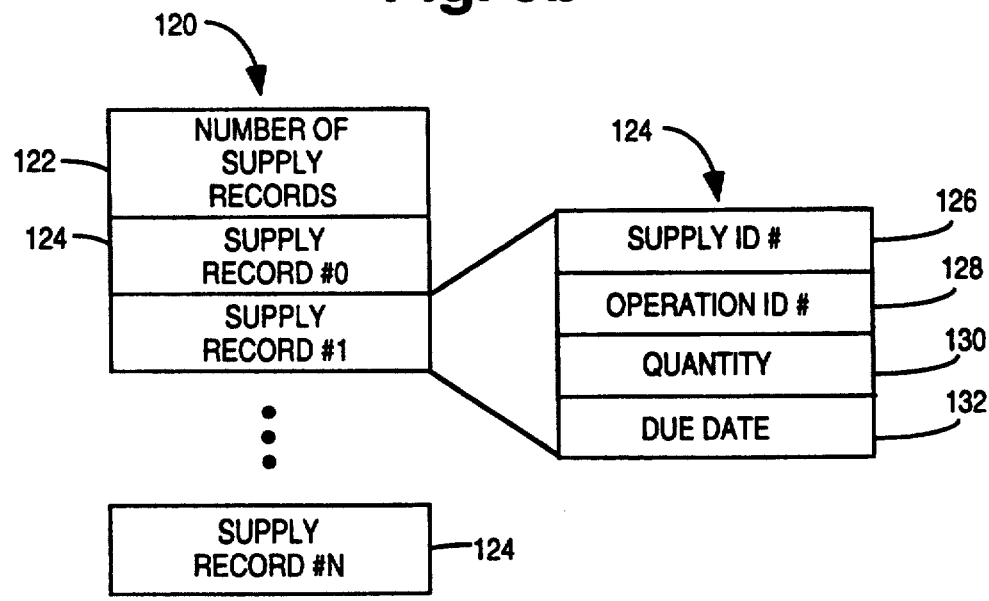

A third type of data stored in the controller 14 comprises data relating to the supply of or the demand for all products manufactured in the plant and all components used in the manufacture of those products. The demand for each product or component, which may be based on purchase orders, forecasts of future demand, etc. or combinations thereof, is represented by a demand data file 100 shown in FIG. 5a.

The demand file 100 includes a field 102 specifying the number of demand records 104 contained in the file 100. Each demand record 104, which corresponds to single demand for the product or component, such as a customer purchase order, consists of four subfields. A subfield 106 contains an alphanumeric entry, such as a purchase order number, specifying the source of the demand; a subfield 108 specifies the identification number of the operation that produces the required component; a subfield 110 specifies the quantity of the component needed; and a subfield 112 specifies the date on which that quantity of the component is needed.

A supply data file 120 contains information relating to the quantity of components available in the plant, which may be based, for example, on current inventory or expected component shipments. The supply file 120, the structure of which is identical to the demand file 100, includes a field 122 specifying the number of the supply records 124 in the file 120. Each supply record 124 includes four subfields 126, 128, 130, 132 specifying, respectively, a supply identification number, the component identification number, the quantity, and the date on which that quantity will be received.

ASSIGNING DATA TO PARALLEL PROCESSORS

In order to utilize the parallel manufacturing system 10 to efficiently schedule operations relating to manufacture of products, the data described above, which is stored in the controller 14, must be distributed among the large number of parallel processors 22 in the massively parallel computer 12.

Figures 6, 9:
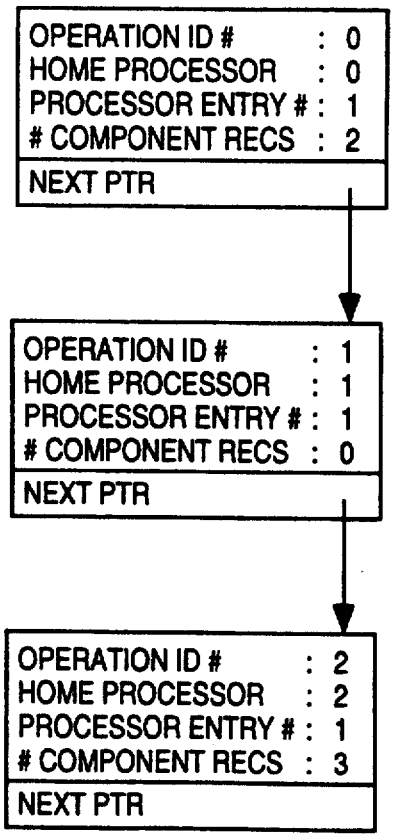
FIG. 6 is an operation mapping table that controls the distribution of data among parallel processors in the manufacturing system.
FIG. 9 is an illustration of three operation mapping records stored in a processor in the system.

To determine how the operation data in the file 40 is to be distributed, an operation mapping file 150, shown in FIG. 6, is generated by the controller 14, which assigns one of the parallel processors 22 to each operation record 46 contained in the operation data file 40. The mapping file 150 shown in FIG. 6 corresponds to an oversimplified case having seven operation records to be distributed among three processors 22. It should be appreciated that a real operation mapping file would have thousands or tens of thousands of entries and include hundreds or thousands of processors.

Referring to FIG. 6, each entry in the operation mapping file 150 contains the identification number of the operation record 46, the home processor 22 to which that operation record has been assigned, the location, or entry number, within that processor where that operation record will reside, and the number of component records 52 contained in the operation record 46.

The work center capacity records 80 shown in FIG. 4 are also distributed among the processors 22. The manner in which they are distributed is controlled by a work center mapping file (not shown) similar to the operation mapping file 150. Each entry in the work center mapping file contains the work center identification number, the home processor 22 to which that work center record 80 has been assigned, the location within that processor 22 where that work center capacity record 80 will reside, and the number of exception records 88 contained in that capacity record 80.

Figure 7:
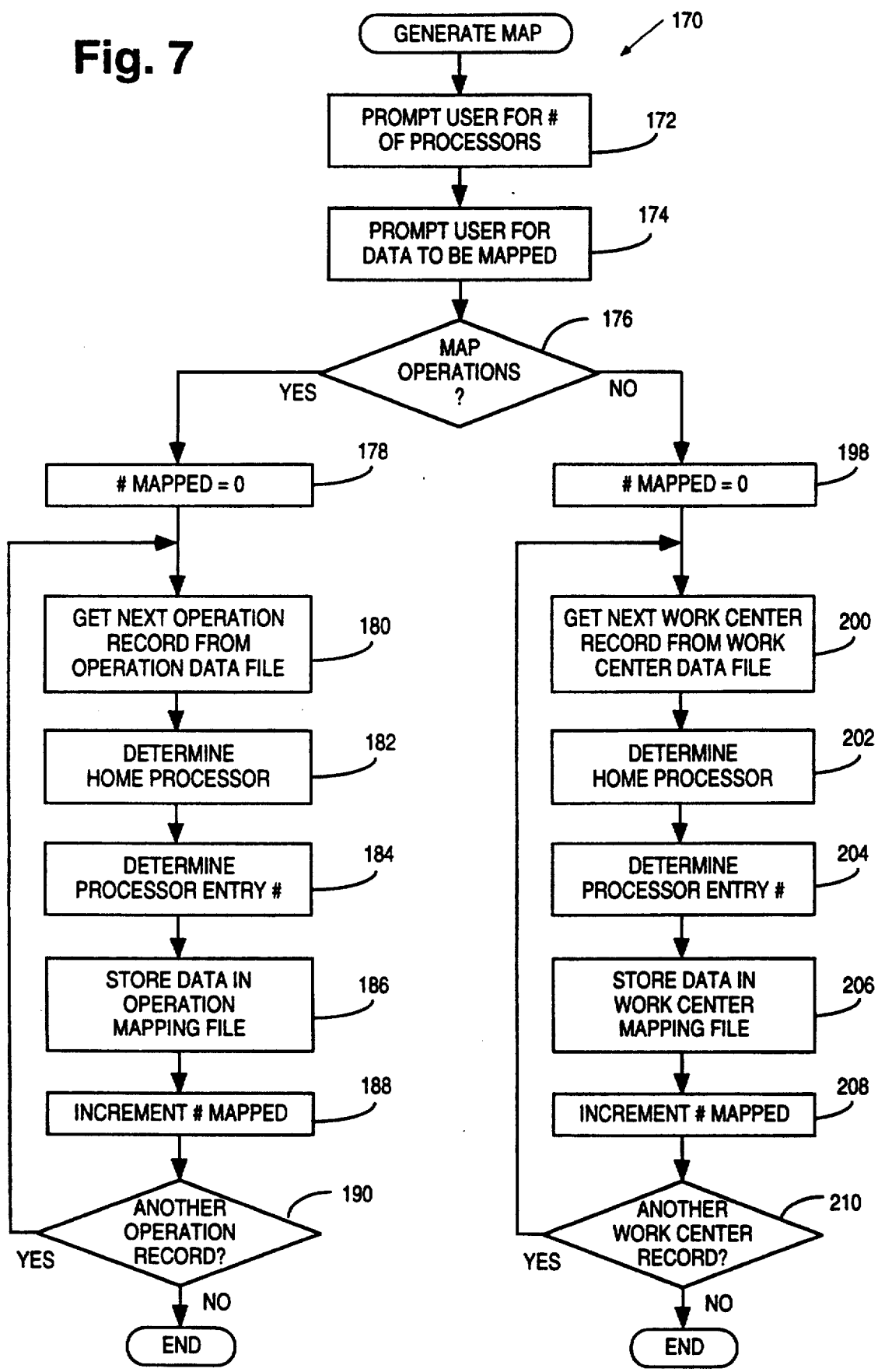
FIG. 7 is a flowchart of a generate map routine executed during operation of the system.

The operation and work center mapping files are generated by a generate map software routine 170 executed by the controller 14, a flowchart of which is shown in FIG. 7. The generate map routine 170 begins at step 172 where the user is prompted for the number of processors to which the work center records or operation records are to be mapped. This number would usually be the number of processors 22 in the massively parallel computer 12, 4,000 for example. At step 174, the user is prompted for the type of data for which a map is generated. This data type is either operation data or work center data.

If operation records are to be mapped as determined at step 176, the routine branches to step 178 where a variable specifying the number of records that has been mapped is initialized to zero. At step 180, the next (or first) operation record 46 that is to be mapped is retrieved from the operation data file 40.

At step 182, the home processor 22 for that operation record 46 is determined by the following equation:

$$Home = (\#Mapped) \bmod{ulo} \; (\#Processors), \qquad [1]$$

where Home is the number of the home processor, #Mapped is the number of operation records 46 that have been mapped, and #Processors is the number of parallel processors to which operation records are being mapped. The modulo function, which is well known, divides #Mapped by #Processors and returns the whole-number remainder as Home. For example, if #Mapped=14 and #Processors=8, Home would be 14 modulo 8, which is 6 (the whole-number remainder when 14 is divided by 8).

At step 184, the entry number or location where the operation record 46 is to be stored in the home processor 22 is determined by the following equation:

$$Entry = truncation\ (\#Mapped/\#Processors), \qquad [2]$$

where Entry is the location in the home processor, #Mapped and #Processors are defined above, and the truncation function truncates any non-whole-number remainder. In the above example where #Mapped=14 and #Processors=8, Entry would be truncation (14/6), or 1.

At step 186, an entry is added to the operation mapping file 150 by storing the identification number of the operation record 46 retrieved in step 180, the number of the home processor 22 determined by Equation [1], the entry number in the home processor 22 determined by Equation [2], and the number of component records 52 in the operation record 46 retrieved at step 180.

At step 188, the #Mapped variable is incremented by one to reflect the fact that another operation record 46 has just been mapped. If there is another operation record to be mapped as determined at step 190, the routine branches back to step 180, where the process is repeated to generate another entry in the operation mapping file 150.

The operation mapping file generated by the above mapping procedure will eventually cause the operation records 46 to be distributed among the processors 22 on a round-robin basis. Each time #Mapped is incremented by one, the result of the modulo function will also increase by one, and thus the home processor number will also increase by one. This process continues until #Mapped is evenly divisible by #Processors, at which point the home processor is processor #0.

The work center mapping file is generated by steps 198-210 in the same manner as the operation mapping file 150. The operation of steps 198-210 is the same as steps 178-190 described above.

Although a specific manner of generating the operation and work center mapping files has been described, any manner of generating those mapping files and distributing the operation and work center records among the processors 22 may be utilized.

MAIN OPERATING ROUTINE

Figure 8A:
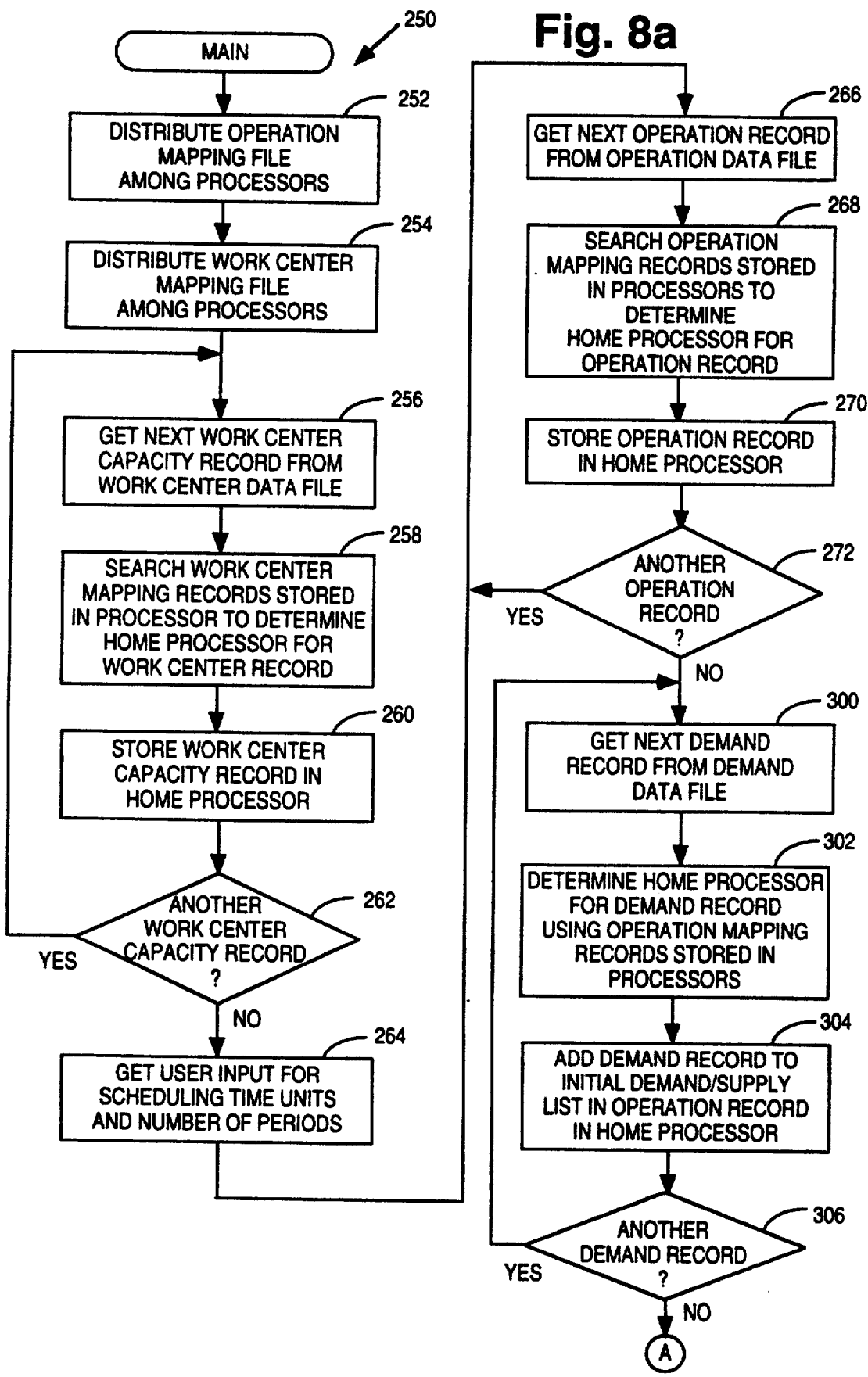
FIGS. 8a and 8b are a flowchart of a main operating routine executed during operation of the system.
Figure 8B:
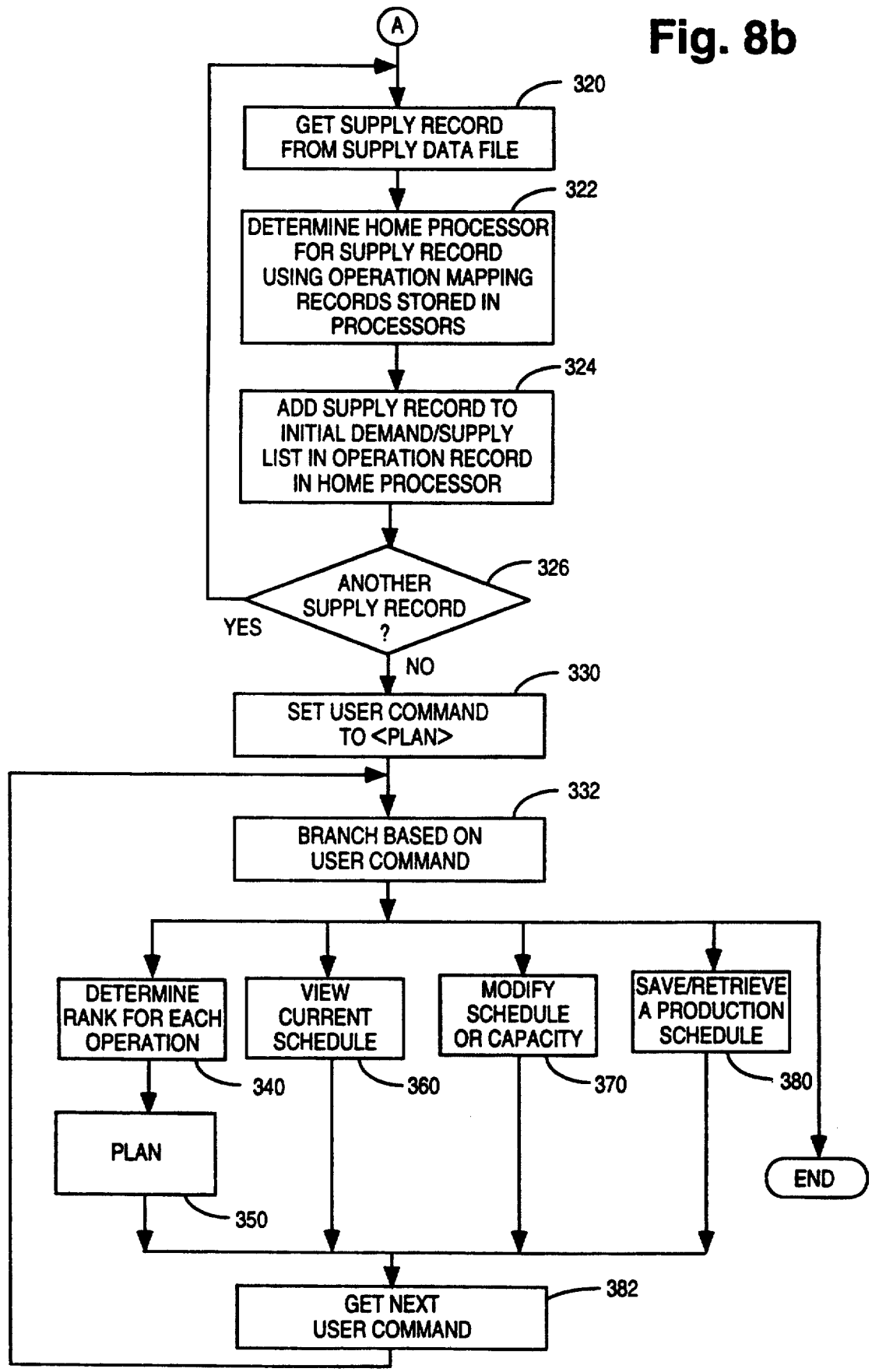

The overall operation of the parallel manufacturing system 10 is controlled by a main operating routine 250, shown in FIGS. 8a and 8b, that is stored in the ACU 20 and executed by each of the processors 22 simultaneously in their SIMD mode of operation. The main operating routine 250 is executed after the controller 14 has executed the generate map routine 170 described above.

DATA DISTRIBUTION TO PARALLEL PROCESSORS

The operation mapping file 150, in addition to being used to determine how the operation records 46 are to be distributed among the processors 22, is also periodically accessed at various points during operation of the system 10 to determine which processor 22 has been assigned as the home processor for a particular operation.

Although the operation mapping file 150 could be stored in the ACU 20 and periodically searched at that location, it is much more efficient to distribute the mapping file among the processors 22 to decrease the necessary search time.

For example, assume that a search of a file would require on average a search of half of the entries contained in the file before the desired entry was found. Also assume that the operation mapping file had 60,000 entries and that 4,000 processors were present in the system.

If the mapping file were stored as a single data file in the ACU 20, the average search time would be 30,000 time units. However, if the 60,000-entry mapping file were distributed equally among the 4,000 processors, so that each processor had 15 entries, and each processor simultaneously searched its own 15 entries, the average search time would be 7.5 time units, which is 1/4,000 of the search time required for the single mapping file stored in the ACU 20.

Accordingly, at step 252 (FIG. 8a), the operation mapping file 150 stored in the ACU 20 is distributed among the processors 22. The entries in the mapping file 150 could be assigned to the processors 22 using the algorithm described in connection with FIG. 7, or any other manner. It is preferable that the number mapping file entries stored in each of the processors 22 is approximately the same.

As a result of step 252, each processor 22 has a number of mapping records. FIG. 9 illustrates a number of such records stored in a particular processor, processor #0, each record corresponding to a single entry in the mapping file 150 shown in FIG. 6. Processor #0 stores the first three entries in the operation mapping file 150 of FIG. 6.

The work center mapping file is distributed among the processors 22 at step 254 in the same manner as the operation mapping file 150 was at step 252.

Steps 256-262 are used to distribute the work center capacity records 80 in the work center data file 70 stored in the controller 14 to the processors 22, in accordance with the work center mapping records that were stored in the processors 22 at step 254.

At step 256, a work center capacity record 80 is retrieved from the data file 70 and stored in a temporary memory location in the ACU 20. At step 258, all of the work center mapping records stored in the processors 22 are simultaneously searched to determine the home processor for the work center record 80 retrieved at step 256. This is accomplished by retrieving from the mapping records stored in the processors 22 the home processor number associated with the work center identification number stored in the capacity record 80. At step 260, the work center capacity record 80 stored in the temporary memory location in the ACU 20 at step 256 is stored in its home processor.

Figure 10:
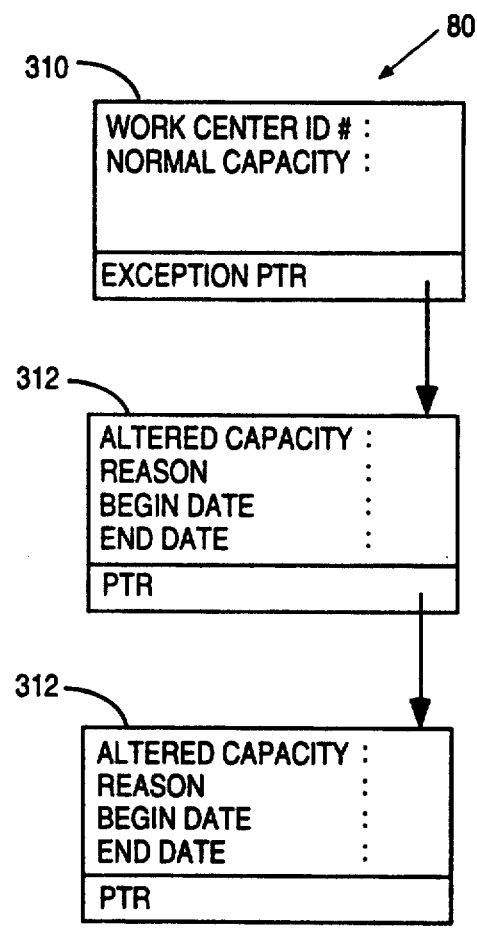
FIG. 10 is an illustration of the format of a work center capacity record stored in the processors in the system.

FIG. 10 illustrates the data format of a work center capacity record 310 as it is stored in its home processor 22. The capacity record 310 is stored in linked-list format, with a first entry containing the work center identification number, the normal capacity, and a pointer to a number of data entries defining exception records. A first exception record 312 contains the altered capacity, the reason for the altered capacity, the begin and end dates of the altered capacity, and a pointer to the next exception record entry 312.

Referring back to FIG. 8a, if there is another work center capacity record 80 in the work center data file 70, the routine branches back to step 256, where the next capacity record 80 is retrieved.

At step 264, the user is prompted to input the scheduling time units, such as hours for example, and the number of time periods of that specified time unit. These inputs are used in the generation of various visual displays, such as the one illustrated in FIG. 23, as described in more detail below.

The purpose of steps 266-270 is to retrieve each operation record 46 from the operation data file 40 stored in the controller 14 and to store the data contained therein in the home processor for the operation record.

At step 266, an operation record 46 is retrieved from the operation data file 40 in the controller 14 and stored in a temporary memory location in the ACU 20. At step 268, each of the processors 22 searches the operation mapping records stored in its memory to determine the home processor and the location in that home processor of the operation record 46 retrieved at step 266.

Figure 11:
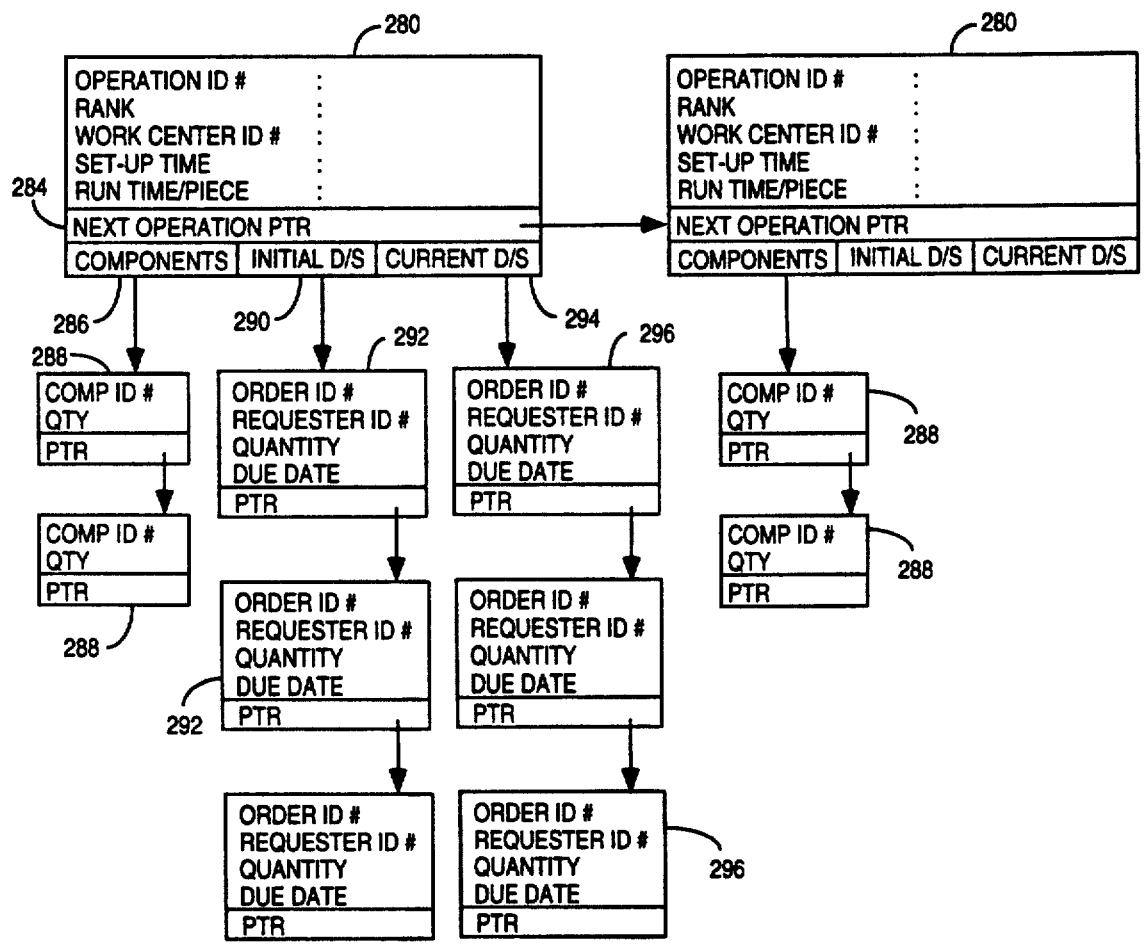
FIG. 11 is an illustration of the format of an operation record stored in the processors in the system.

At step 270, the operation record data is moved from its temporary memory location in the ACU 20 to the memory of its home processor. The data format of operation records 280 stored in the processors 22 is illustrated in FIG. 11, which shows two operation records 280. Each of the operation records 280 contains the operation identification number, the rank of the operation (discussed below), the identification number of the work center where the operation is performed, the set-up time required for the operation, and the run-time per piece required for the operation.

Each of the operation records 280, which is stored in linked-list format, also includes four pointers. A pointer stored in a data field 284 specifies the address of the next operation record 280 stored in the memory of that processor; a pointer stored in a data field 286 specifies the address of the first of a number of component records 288 which contain data relating to each of the components used in the operation; a pointer stored in a data field 290 specifies the address of a first list, referred to herein as the "initial list," of a number of initial demand/supply records 292; and a pointer stored in a data field 294 specifies the address of a second list, referred to herein as the "current list," of a number of current demand/supply records 296. The use of the initial and current lists of demand/supply records is discussed below.

During step 270 (FIG. 8a), only the operation record 280 and any associated component records 288 are stored in the home processor for that operation; the demand/supply records 292, 296 of the initial and current lists are added to the operation record 280 during later points in the routine as described below.

After an operation record 280 is stored in the memory of its home processor at step 270, step 272 determines whether there is another operation record 46 to be retrieved from the operation data file 70 stored in the controller 14. If there is, the routine branches back to step 266 where the next operation record 46 is retrieved. Steps 266-272 repeat until all of the operation records 46 in the operation data file 40 stored in the controller 14 have been stored in their respective home processors 22.

The purpose of steps 300-306 is to retrieve each of the demand records 104 (FIG. 5a) stored in the demand file 100 in the controller 14 and add it to the initial demand/supply list in its operation record 280 (FIG. 11) in its home processor. At step 300, the next demand record 104 is retrieved from the demand file 100 and stored in a temporary memory location in the ACU 20. At step 302, the processor where that demand record should be stored is determined by searching the operation mapping records stored in each of the processors 22. When the home processor for the operation number contained in the data field 108 of the demand record 104 is found, at step 304 the demand record data stored in the temporary memory location in the ACU 20 is written to the next initial demand/supply record 292 in the operation record 280 stored in that processor. At step 306, if there is another demand record to be stored, the routine branches back to step 300.

Referring to FIG. 11, the data format for the demand/supply records 292, 296 stored in the processors 22 is slightly different than the format of the demand and supply records 104, 124 stored in the controller 14. Each of the demand/supply records 292, 296 stored in the processors 22 includes a order identification number, a requester identification number, a quantity, a due date, and a pointer to the next demand/supply record.

In the case where the demand/supply record is a demand record that was generated by a customer order, the order identification number is a number identifying the customer purchase order that generated that demand.

If the demand record was generated directly in response to a customer order (the customer specifically ordered that product or component), the requester identification number is also the customer purchase order number. However, if the demand record was generated by a need for a higher level part (as described below), the requester identification number is the identification number of the parent operation.

In the case of a supply record, the order identification number is left blank and the requester identification number is an inventory control number or a number corresponding to the purchase order generated by the plant to buy that component.

Referring to FIG. 8b, steps 320-326 are analogous to steps 300-306, except that the supply records are stored instead of the demand records.

After the steps 252-326 are completed and the data is stored in the parallel processors, the operator may perform various basic steps which are shown schematically in FIG. 8b. These steps include a planning step 350, which generates data relating to the plant production schedule; a view current schedule step 360, which allows the operator to inspect the current production schedule for scheduling conflicts; a modify schedule or capacity step 370, which allows the operator to make various modifications to the plant schedule or capacity to resolve scheduling conflicts; and a save/retrieve a production schedule step 380, which allows the operator to save data specifying the current production schedule or to retrieve previously stored data specifying a different production schedule. Each of the above steps is performed via a respective software routine described in more detail below.

The above steps are selected via the operator at step 382, after which the routine branches to the selected step via the branch step 332. However, the initial branch at step 332 is predetermined in step 330 to be the plan step 350 so that a production schedule is immediately generated. The plan step 350 is preceded by a step 340 which, as described in more detail below, assigns a rank to each operation for which a production schedule is to be generated.

ASSIGNING RANKS TO OPERATIONS

As described above, the parallel manufacturing system uses an explosion procedure to determine the net requirements for all components necessary for a product. Before the explosion procedure is performed, each of the operations required in the manufacture of all products is assigned a rank. The assignment of a rank to each operation, which is conventional and is also performed in current MRP II systems, is used to account for a number of circumstances, including: 1) account for a number of circumstances, including: where a component is used in the manufacture of different products and appears in a different level in each of the trees associated with those products; and 2) where a component is used more than once in the manufacture of a single product and appears in different levels of the tree associated with that product.

FIG. 12 illustrates two relational trees that have been simplified to show only the relationship between the operations necessary to make the products. However, since there is a one-to-one correspondence between each operation and the component or product it produces, each of the simplified trees also shows the relationship among the components necessary to make the products. For example, operation #0 (which makes product #0) requires operations #1 (which makes component #1) and #2 (which makes component #2). Each operation in each tree has been assigned a level number, depending on which level the operation appears in its tree. The uppermost operations in each tree have been assigned level 0 and the lowermost operations in one of the trees has been assigned level 3.

As described above, the explosion procedure is performed simultaneously on all product trees, beginning with level 0 for all trees and proceeding down the tree one level at a time. If this procedure were performed on the two trees of FIG. 12, the net requirement for component #4 would be determined on level 1 in the tree for product #8. However, that net requirement would not be accurate since there are additional requirements for component #4, resulting from its appearance in level 2 of the tree for product #0.

In order to avoid errors in determining net requirements or the necessity of correcting such errors, the system 10 assigns a rank to each operation in each product tree to ensure that the net requirements determination for a single component or operation occurs at the same time, and the system 10 performs the explosion procedure based upon the rank, not the level in the tree.

Figure 12A:
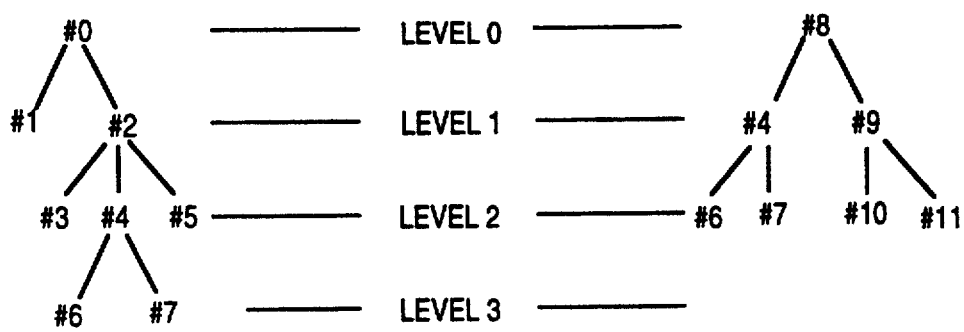
FIGS. 12a and 12b illustrate the level and rank relationship of operations used in the manufacture of a product.
Figure 12B:
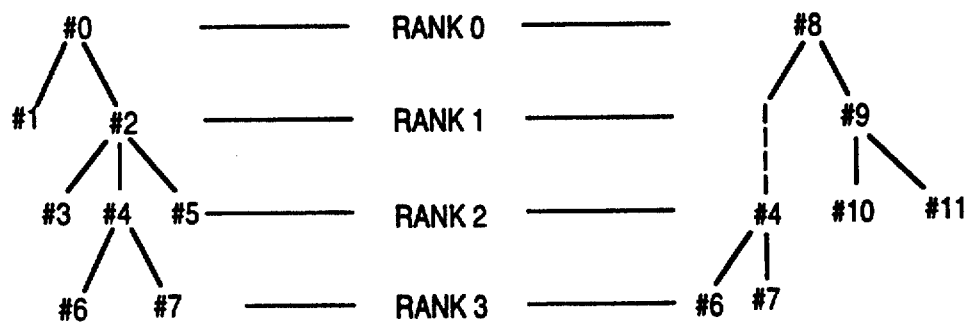

When an operation appears in different levels of different product trees, or in different levels of the same product tree, the rank assigned to that operation corresponds to the lowest level in the product tree(s) in which it appears. FIG. 12b illustrates the assignment of a rank to each operation for the product trees shown in FIG. 12a. The operation rank equals the tree level in which the operation appears, except where an operation has different tree levels, in which case the rank is the lowest tree level. Thus, since operation #4 appears both in levels 1 and 2 in the trees of FIG. 12a, its rank is the lower of those two levels, rank 2, in the ranked tree of FIG. 12b. Operations #6 and #7 have also been assigned a rank lower than their tree level. The effect of assigning a rank to each operation corresponding to the lowest tree level is to ensure that the net requirements for any one operation or component are determined at the same time, regardless of the fact that operation or component may appear in different levels of one or more product trees.

Figure 13:
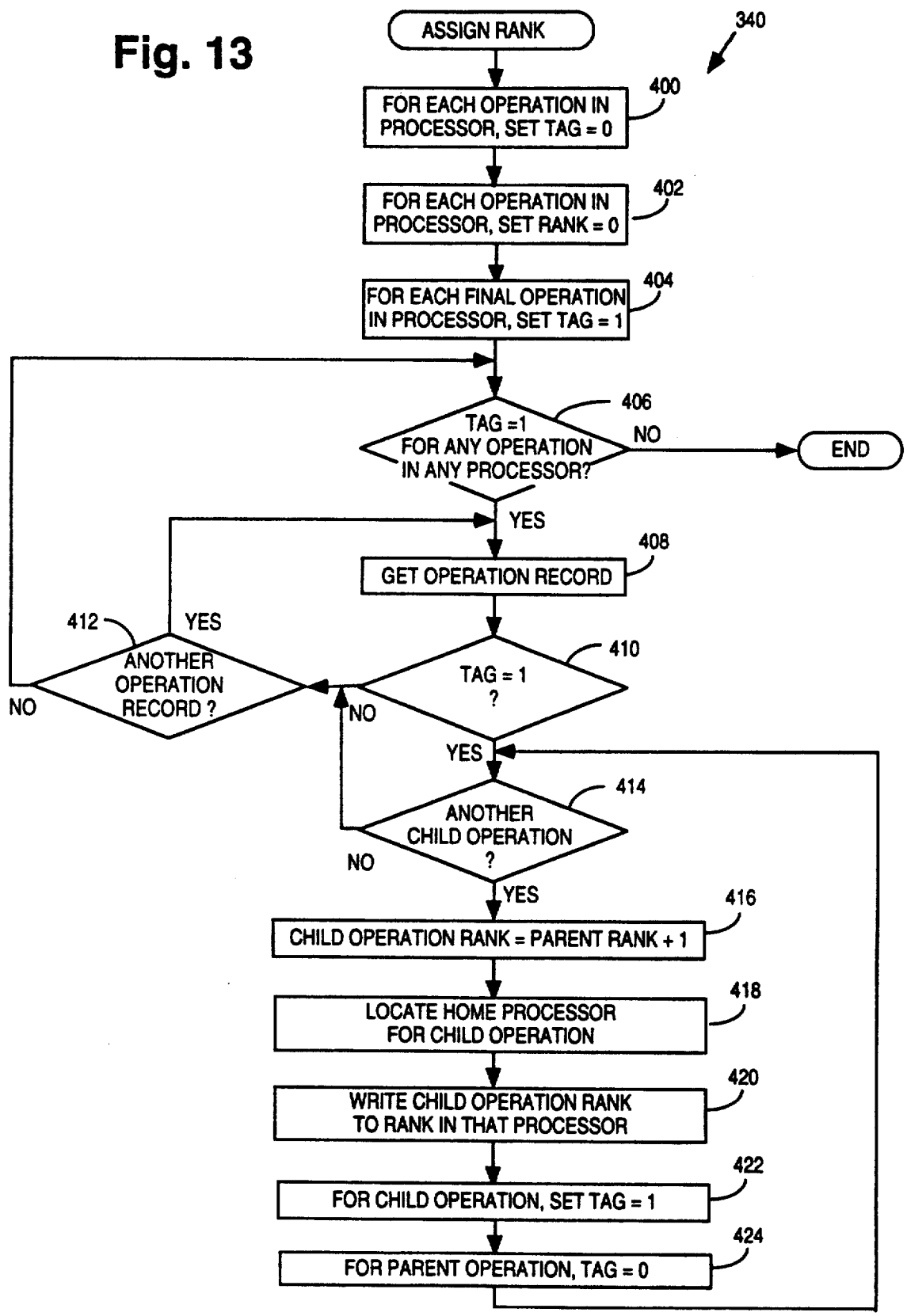
FIG. 13 is a flowchart of an assign rank software routine executed during operation of the system.

A flowchart of an assign rank software routine for assigning each operation a rank, shown schematically in FIG. 8b as step 340, is illustrated in FIG. 13. The assign rank routine 340 begins at step 400 where each processor 22 in the parallel computer 12 sets a variable TAG to 0 for each operation in the processor 22. Each operation has its own TAG variable. At step 402, each processor 22 in the computer 12 sets the rank of each operation stored in that processor to 0. The RANK variable for each operation is stored in the operation record 280 (FIG. 11) for that operation. At step 404, each processor 22 searches its operation records 280 to determine whether it has any final operations that result in a product. These final operations would be those appearing in level 0 of a product tree. For all such operations, the TAG variable is set to 1.

Step 406 is the beginning of a loop in which each operation having a TAG value of 1 assigns an initial rank to the operations immediately below that operation, referred to as child operations. For example, if operation #8 in FIG. 12a had a TAG variable equal to 1, it would set the initial rank of operations #4 and #9, its child operations, to 1. Operation #8 is referred to as a parent operation of operations #4 and #9. At step 406, if the TAG variable of any operation in the processor is 1, the routine branches to step 408. If not, the rank assignment routine is finished.

At step 408, the first operation record 280 in the processor is retrieved to determine the value of its TAG variable. If the TAG variable is not 1 as determined at step 410, which means that operation has not been activated to change the rank of its child operations, if any, the routine branches to step 412. If there is another operation record 280 in the processor 22, the routine branches back to step 408 to get the next operation record. If there are no more operation records as determined at step 412, the routine branches back to step 406.

If the TAG variable of the operation record 280 that was retrieved at step 408 is 1, meaning that that operation is active to change the rank of its child operations, if any, the routine branches to step 414 where the routine determines whether the present operation has any child operations (determined by looking for component records 288 in the operation record 280). If there are no child operations, the routine branches to step 412. If there is a child operation, the routine branches to step 416 where the rank of that child operation is set to one more than the current rank of the parent operation. At step 418, the home processor for the child operation is located, and at step 420 the new rank for the child operation is written into the operation record 280 in the home processor for that child operation. At step 422, the TAG variable for the child operation is set to 1, and at step 424 the TAG variable for the parent operation is set to 0. The routine then branches back to step 414 to determine whether the parent operation has another child operation. Steps 414-424 are repeated for each child operation of the parent.

During the above routine, each operation in each product tree is periodically activated, by changing its TAG variable to 1, beginning at the top of the tree.

Each "tagged" operation then assigns an initial rank to each of its child operations, if any, of one greater than its own rank. The parent operation then "tags" its child operations, and they in turn assign the initial rank of their own child operations to one more than their own rank. If an operation appears on more than one level of a tree, the rank for that operation will be assigned an initial value, but that initial value will be subsequently changed to a greater value. Referring to FIG. 12a, operation #8 would initialize the rank of its child operation #4 to 1 (one greater than the rank of operation #8 which is 0), but later on, when operation #2 was "tagged," it would assign the rank of its child operation #4 to be 2 (one greater than the rank of operation #2, which is 1). Similarly, operations #6 and #7 would also be initially assigned a rank of 2, but that rank would be subsequently changed to 3.

Figure 14:
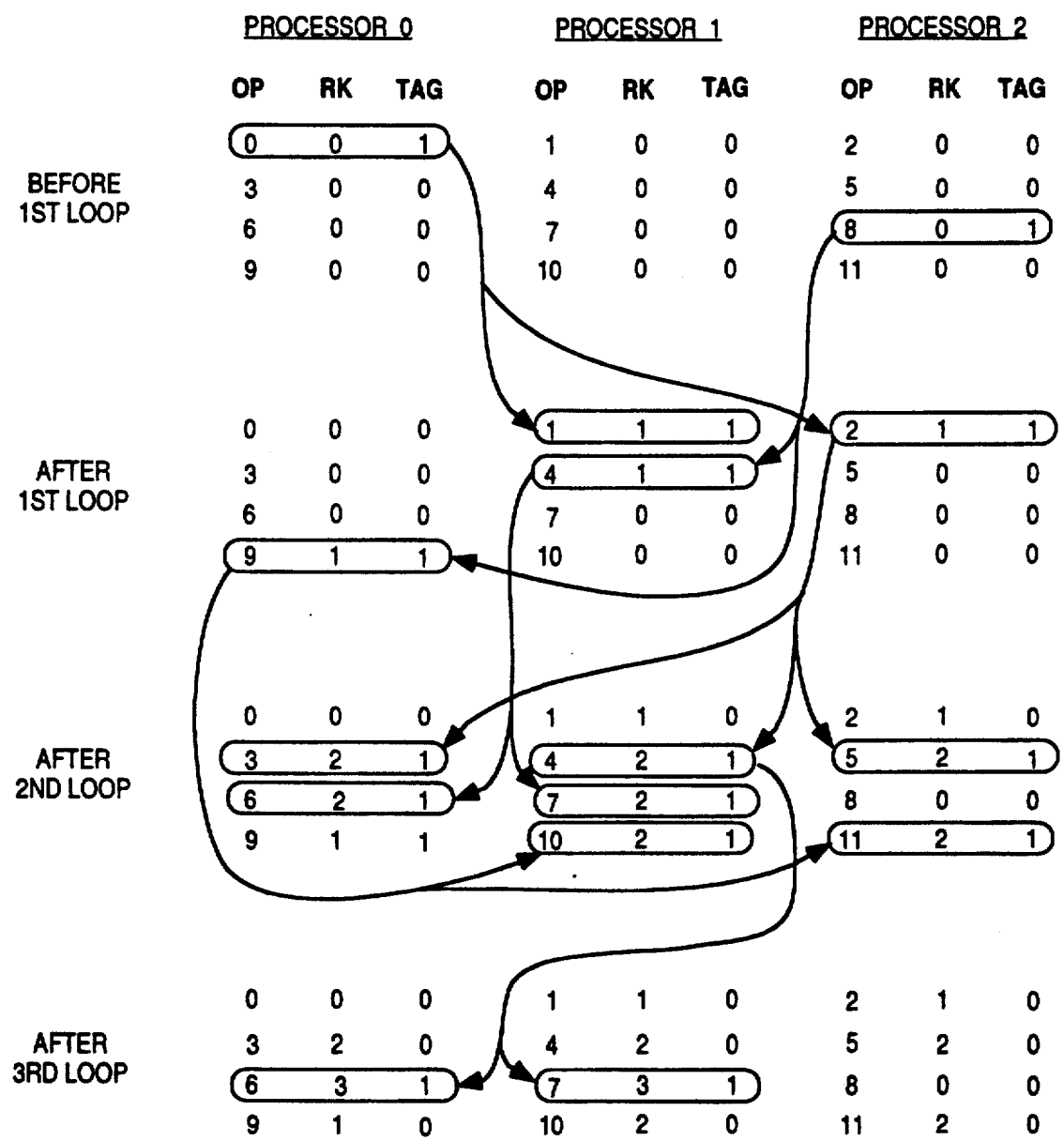
FIG. 14 is an illustration of the contents of a number of variables during the operation of the assign rank routine illustrated in FIG. 13.

FIG. 14 illustrates the status of the TAG and RANK variables for each operation during the execution of the routine of FIG. 13 for a system having three processors and operations #0 to #11 illustrated in the trees of FIG. 12a. The status of the TAG and RANK variables for each operation #0 to #11 is shown at four different points in time: 1) just prior to the execution of the loop of steps 406–424; 2) after one execution of that loop; 3) after two executions of that loop; and 4) after three executions of that loop.

It should be appreciated that, although a particular manner of assigning ranks to the operations is described, conventional MRP II systems perform the same task, and the ranks may be assigned in other ways than that described above.

THE PLANNING FUNCTION

The planning function, which utilizes the explosion procedure described above to determine the net requirements of all products and components and the dates on which all operations must take place, i.e., which generates the production schedule, is performed after all operations in the system have been assigned a rank.

Figure 15:
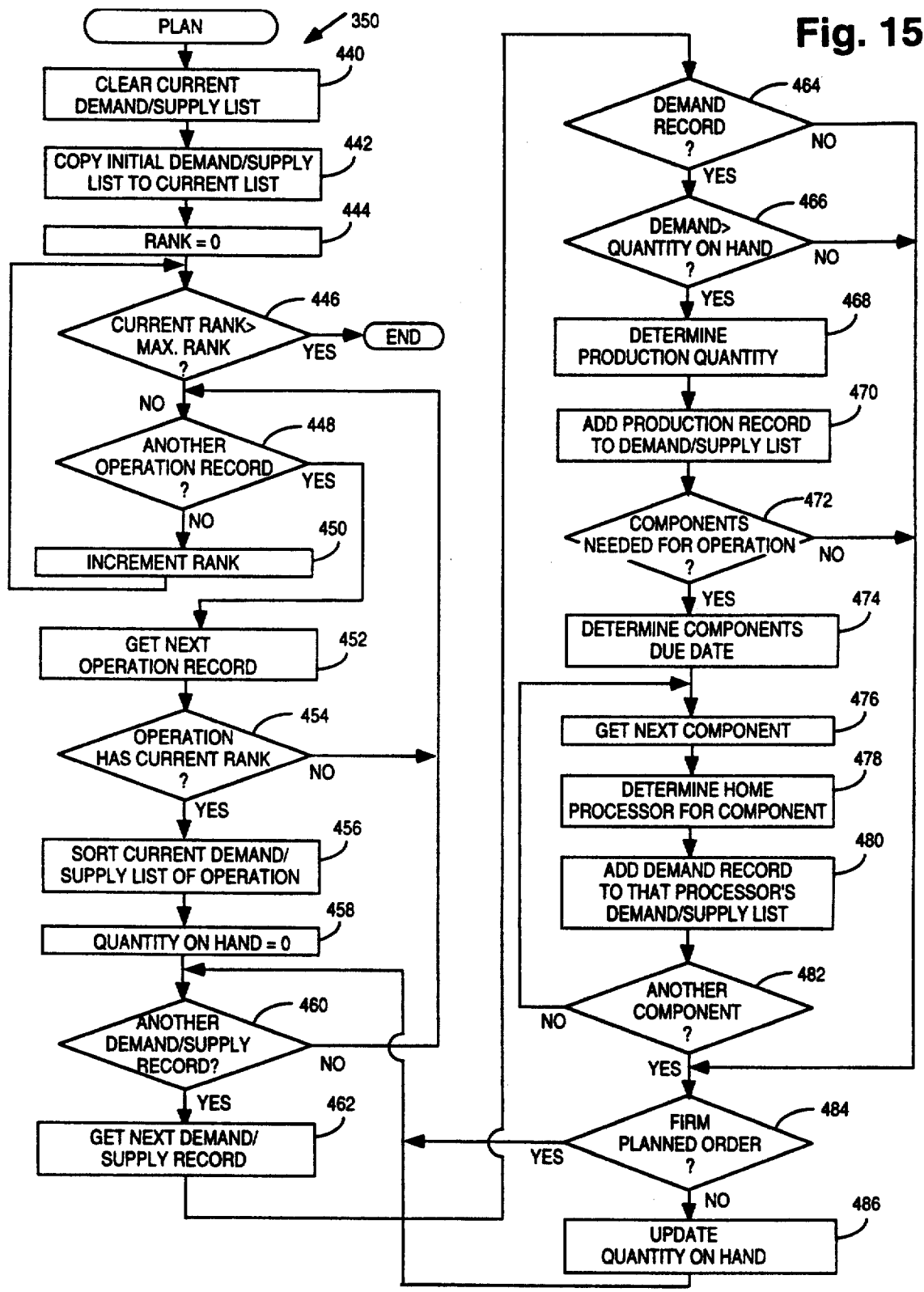
FIG. 15 is a flowchart of a plan routine executed during operation of the system.

A flowchart of the planning function is shown in FIG. 15. At step 440, the current demand/supply list, which is the list of demand and supply records 296 shown in FIG. 11, is cleared. At step 442, the initial demand/supply list is copied to the current demand/supply list by duplicating all the demand and supply records 292 and placing them in the current demand/supply list.

At step 444, a RANK variable is initialized to 0. As described above, the explosion process is performed based on the rank of operations, beginning at rank 0 and proceeding until the maximum rank for any product tree is reached. At step 446, if the current value of the RANK variable is greater than the largest rank of any operation record stored in the processor, the routine is finished. If not, the routine branches to step 448 where the routine determines whether there is another operation in the processor to be exploded.

For each rank, the processor successively examines all of the operation records 280 to determine whether there are operations having the current rank, in which case they are exploded to determine the net requirements for the operation. If there are no more operation records 280 for a given rank as determined at step 448, the value of RANK is incremented by one, and the routine branches back to step 446 where it continues if the current rank is not greater than the maximum rank of any operation.

If there is another operation record 280 at the current rank as determined at step 448, the processor gets the next operation record at step 452 and examines its rank. At step 454, if the rank of the operation is not equal to the current value of the RANK variable, then the net requirements for that operation are not determined, and the routine branches back to step 448 to determine whether there is another operation record.

If the operation has the current rank, the routine will determine the net requirements for the operation and the components necessary for that operation. At step 456, the current demand/supply list for the operation is sorted by due date, with the current demand/supply records 296 having the earliest due dates being placed earlier in the list. If there are demand and supply records having the same due date, those demand and supply records are sorted so that the supply records are placed earlier than the demand records in the list.

FIGS. 16a and 16b illustrate this sorting step. FIG. 16a shows three demand/supply records 296 in the order in which they are stored in the current demand/supply list, including a first demand record for a quantity of 35 due day 10, a second demand record for a quantity of 50 due day 4, and a third supply record for a quantity of 30 which will be in stock on day 4.

FIG. 16b illustrates how those three records are sorted. The last record in the list of FIG. 16a has been moved first since its due date is the earliest and since it is a supply record, which is placed before a demand record if the due dates are the same. The first record in the list of FIG. 16a has been moved to the last position in FIG. 16b since it has the latest due date.

Referring back to FIG. 15, at step 458 the quantity on hand is initialized to zero. The quantity on hand is a running total of the net requirements of a component when both current demand and supply records 296 are taken into account as of a certain date.

During steps 460–486, all of the current demand/supply records 296 for the current operation record 280 are examined to determine the net requirements for the component or product made by that operation. At step 460, if there is not another demand or supply record 296, then all the demand/supply records for the current operation have been examined, and the routine branches back to step 448 to determine whether there is another operation record in the processor for which net requirements must be determined.

If there is another demand or supply record 296, the routine branches to step 462 where the next demand or supply record is retrieved. If the next record is a demand record, then the routine branches to step 466 to determine whether the quantity on hand is sufficient to satisfy the quantity in the demand record 296. If there is not enough quantity on hand to satisfy the demand, the routine branches to step 468 where the production quantity for the component produced by the current operation is determined by subtracting the quantity on hand from the quantity demanded.

At step 470, a production record, which will cause the necessary quantity of components to be manufactured, is added to the current demand/supply list. The production record has the same format as the demand/supply records 296. The quantity set forth in the production record 296 is the production quantity determined in step 468 and the due date is the due date of the demand record that caused the quantity on hand to be negative.

The parallel manufacturing system 10 utilizes infinite scheduling, which schedules operations in work centers without regard to the capacity of the work center or how much work has already been assigned to the work center. Thus, in scheduling an operation, it is not necessary to determine whether the work center in which the operation will be performed is actually available on the due date set forth in the production record. As described below, once all operations have been scheduled, it is the responsibility of the operator to resolve all scheduling conflicts.

FIG. 16c illustrates the insertion of a production record 296 as the third record in the current demand/supply list. The production quantity is specified as 20 (the demand quantity of 50 minus the supply on hand of 30) and the due date is the date of the demand record immediately above the production record. The requester identification number in the production record is the identification number of the operation that will make the production quantity of the component.

Steps 468-472 will thus cause the necessary quantity of the component or product to be made. However, if the operation that makes that product or component requires any components, the manufacturing system 10 also generates a demand record for each such component since it will be needed in the operation that has just been scheduled.

For example, referring to FIG. 2, assume that the system 10 has examined the next demand record for component #2 and determined that the quantity demanded is 40 units greater than the quantity on hand. The system would set a production quantity of 40 for component #2 and would schedule operation #2 to make those 40 components. Since operation #2 requires components #3, #4 and #5, the system would locate the operation records for the operations that produce components #3, #4 and #5, and would add a demand record to each of those operation records, each demand record having a production quantity of 40 and a due date to correspond to the start date of operation #2.

Referring back to FIG. 15, steps 472-482 ensure that any components that are necessary for an operation that has just been scheduled will be produced in time for the start of that operation. At step 472, the routine determines whether any components are required for the operation just scheduled. This is accomplished by checking the operation record 280 (FIG. 11) for the operation just scheduled to determine whether it has any component records 288 appended to it.

At step 474, the due date by which all components must be manufactured is determined in accordance with the following equation:

$$Due = Parent\ Due - Setup - (Run - Time * Quantity), \quad [3]$$

manufactured, Parent Due is the due date for the parent operation as specified in the production record 296 generated during step 470, Setup is the set-up time for the operation that makes the component as specified in the operation record for the component operation, Run-Time is the run-time per piece for the component operation, and Quantity is the quantity to be produced as specified by the production record generated during step 470 (multiplied by the number of components used in the operation, if more than one).

After the determination the component due date, the routine branches to step 476 where it gets the next component record 288 and determines the home processor of the operation that makes that component. Once the home processor is found, the routine adds a demand record to the current demand/supply list in the operation record in the home processor. If there are any more components necessary for the scheduled operation, the routine branches back to step 476.

The process of storing demand records 296 during steps 476-482 is shown in FIG. 17, which illustrates a number of operation records 280 stored in three processors #0, #1 and #2 in accordance with the operation mapping table 150 illustrated in FIG. 6. Processor #0 is the home processor for operation #3; processor #1 is the home processor for operation #4; and processor #2 is the home processor for operations #2 and #5. FIG. 17 also corresponds with the product tree shown in FIG. 2 in that operation #2 requires components #3, #4 and #5. Thus, the operation record 280 for operation #2 has three component records 288: a first one indicating that one component #3 is required in operation #2, a second one indicating that two of component #4 are required in operation #2, and a third one indicating that one component #5 is required for operation #2. Assuming that operation #2 has just been scheduled to produce 40 of component #2 on day 10, the three demand records 296 shown in FIG. 17 are generated. In each demand record 296, the requester identification number is the identification number for operation #2.

Referring back to FIG. 15, if at step 464 the record 296 was not a demand record, then the routine branches to step 484, skipping steps 468-482 since no production must be scheduled because the record is a supply record. Steps 468-482 are also skipped if the current record is a demand record, but the quantity demanded is covered by the quantity on hand.

At step 484, the routine determines whether the current demand/supply record is a firm planned order, which is a fictitious order that is used by the operator to force the system to produce a quantity of a particular component earlier than it otherwise would.

FIG. 16e illustrates, in chronological order, a supply record, a firm planned order (FPO), a production record, and a demand record. Firm planned orders have the same data format as demand/supply records 296. The FPO of FIG. 16e, which generates a fictitious demand of 50 on day 4, cause the system to generate a production record to make 10 on day 4. The quantity on hand is not reduced by the −50 units in the FPO since that order is fictitious and those components will not be shipped. If the FPO were not used in this case, the production record would not cause the components to be manufactured until day 8, the due date of the demand order. Thus, the effect of the FPO is to shift the production of 10 components from day 8 to day 4. This would be advantageous if the only available capacity to make the 10 units was on day 4.

Referring back to FIG. 15, if the current record 296 is not a firm planned order as determined at step 484, the routine branches to step 486 where the quantity on hand is updated. If the current record is a firm planned order, the quantity on hand is not updated since the quantity set forth in the firm planned order will never be shipped.

FIG. 16d illustrates a string of demand/supply records, including two production records that are created when the net requirements are negative. FIG. 16d also shows the value of the quantity on hand as the quantities in the demand/supply records are successively summed.

After step 486, the routine branches back to step 460 to determine whether there is another demand/supply record in the operation record for the current operation. Steps 462-486 are repeated for each demand/supply record for the current operation. When there are no more demand/supply records for the current operation, the routine branches back to step 448, where the whole process continues until there are no more operations for the current rank.

As described above, each time the planning routine 350 is performed, production records for each component and demand records for each child component are generated and added to the current demand/supply list. A great number of such records are typically generated, particularly for a relatively complicated system. These records are "dependent" records in that they are generated in response to other records, such as a customer purchase order, which is considered an "independent" record. If any modifications are made to the independent records, a substantially different set of dependent records (i.e. production records) will be generated from the changed independent records. As a result, during each execution of the planning routine, there must be a way to "delete" dependent records that were generated during a prior execution of the routine.

Figure 30:
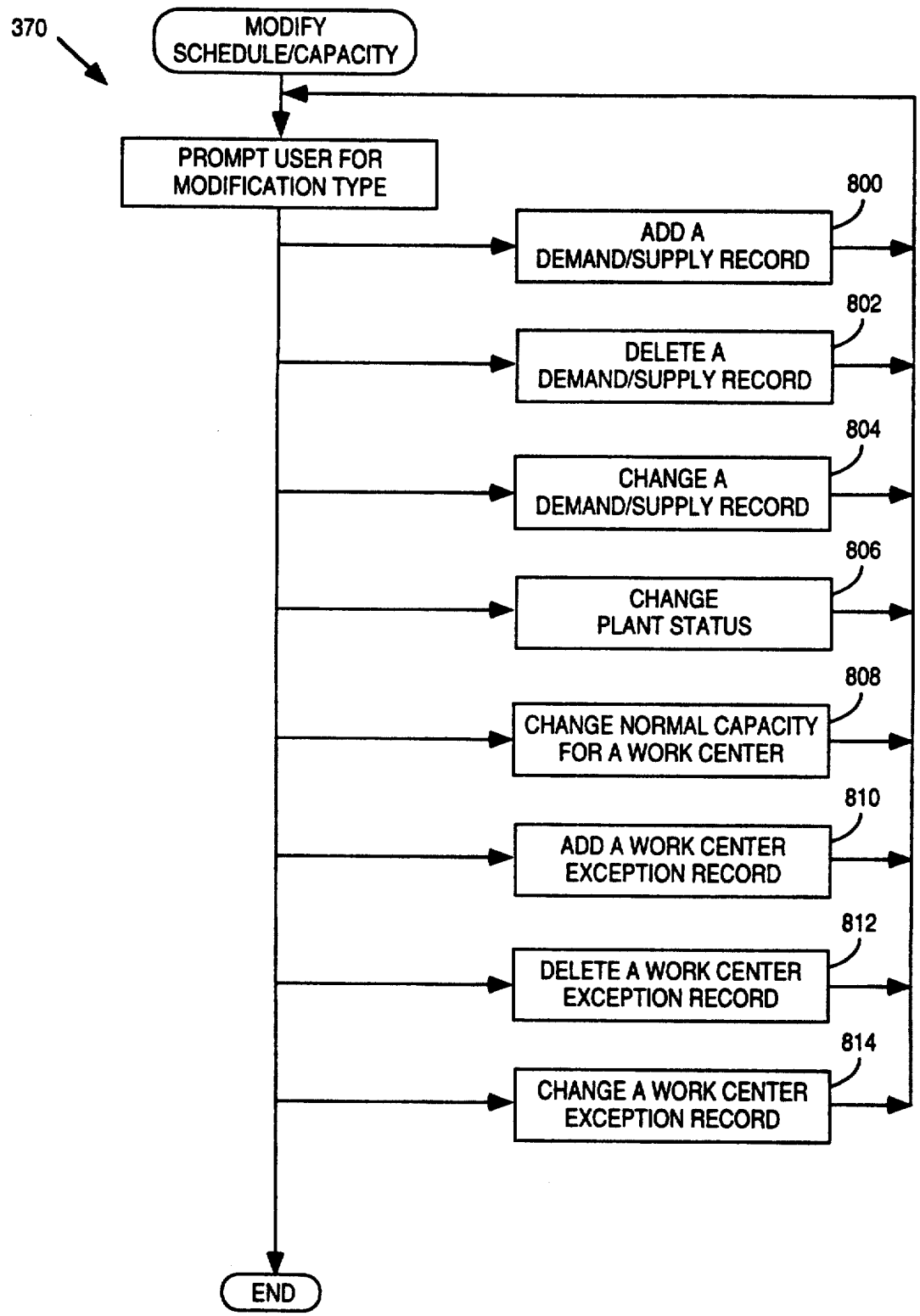
FIG. 30 is a general flowchart of a modify schedule/capacity routine executed during operation of the system.

This "deletion" is accomplished by having the two separate current and initial demand/supply lists. During operation of the planning routine, all dependent records that are created are placed in the current demand/supply list. Independent records, which are generated in other routines such as the modification routine described below in connection with FIG. 30, are always placed in the initial demand/supply list. Each time the planning routine 350 begins, the current demand/supply list is overwritten by the initial demand/supply list. As a result, all dependent records in the current list that were generated during the prior execution of the planning routine are erased, while the independent records in the initial list are not erased.

SCHEDULE INSPECTION BY THE OPERATOR

After the completion of the planning function described above, an operator of the system 10 may request the scheduling data that was generated during the planning function to be displayed on one of the CRTs 16 in various data formats. One important purpose in generating scheduling displays is to allow the operator to inspect the current production schedule for scheduling conflicts, which will normally be present due to the infinite-capacity scheduling method used by the planning routine.

Figure 18:
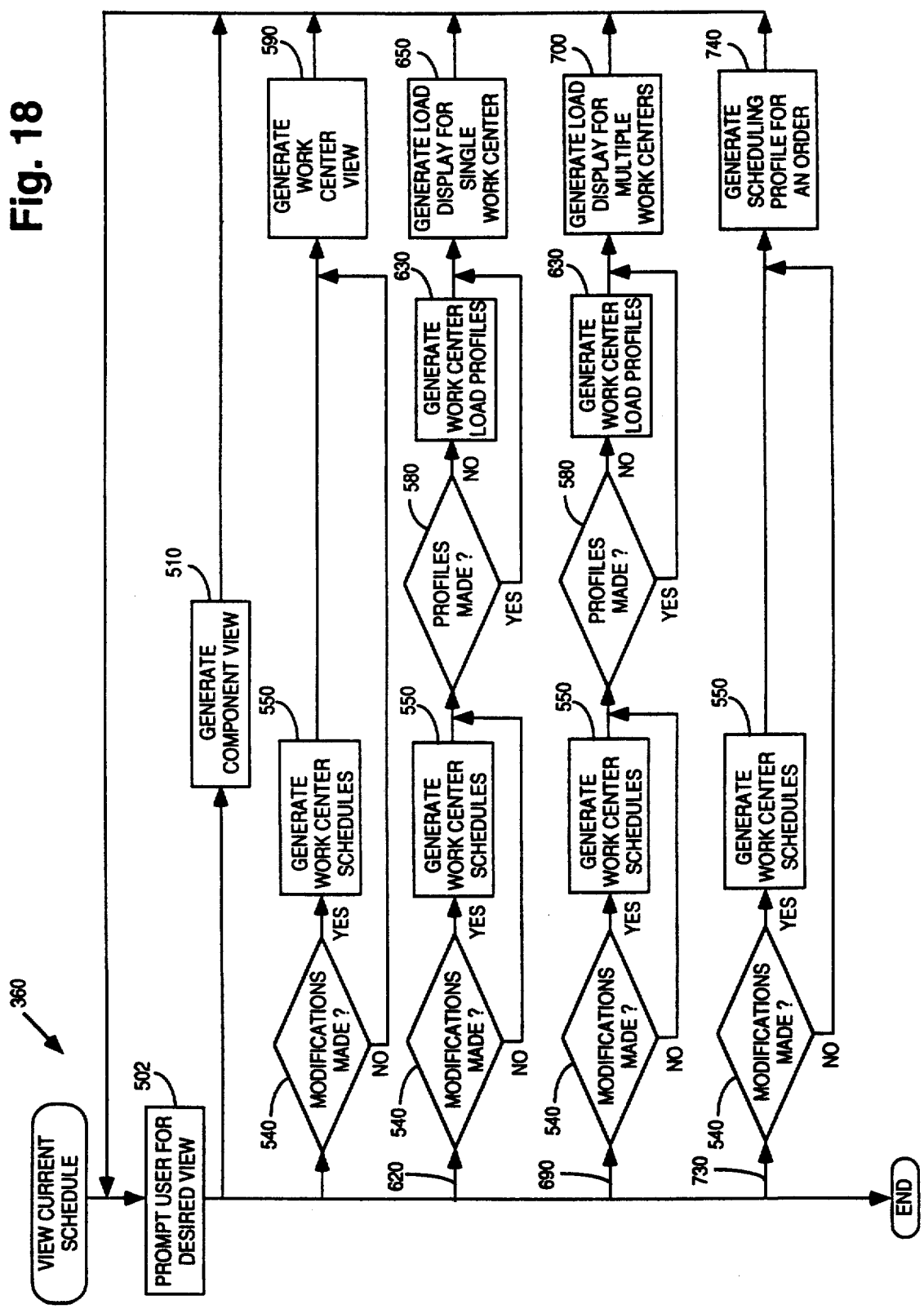
FIG. 18 is a general flowchart of a view current schedule routine executed during operation of the system.

FIG. 18 is a flowchart of a view current schedule routine 360. This routine 360, which is shown schematically in FIG. 8b, allows the operator to select one of five different data displays that illustrate various aspects of the current production schedule.

COMPONENT VIEW

Referring to FIG. 18, at step 502 the operator is prompted for the desired view. If the operator selects a component view, the routine branches to step 510 which generates a display on the operator's CRT 16 that shows all demands for and supplies of a particular component selected by the operator. Using this view, the operator can immediately check the status of any component in the plant, including the current quantity on hand and future demand and supply quantities.

Figure 19:
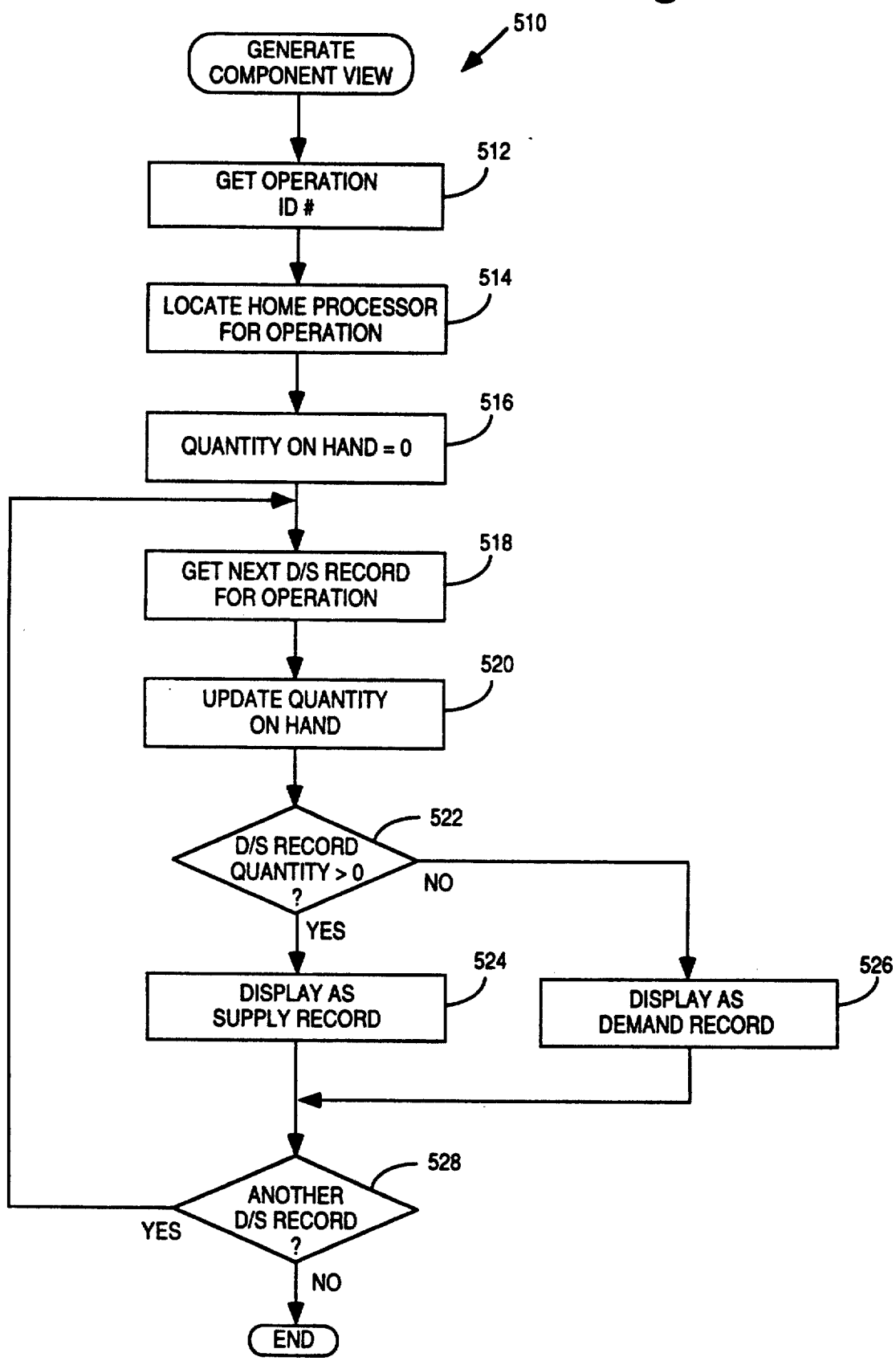
FIGS. 19, 21-22, 24-27 and 29 are flowcharts of various portions of the view current schedule routine shown schematically in FIG. 18.

A flowchart of the generate component view step 510 is shown in FIG. 19. Referring to FIG. 19, at step 512 the operator is prompted for and inputs the identification number of the operation that produces the component whose status is to be checked. At step 514, the home processor of the operation is determined by searching the operation mapping records in the processors for the operation identification number entered by the operator. At step 516, the quantity on hand of the component produced by the operation is initialized to zero.

Steps 518-528 are repeated once for each demand/supply record 296 in the operation record 280 for the selected operation. At step 518, the next demand/supply record 296 is retrieved. At step 520, the quantity on hand is updated by adding to the current quantity on hand the quantity specified by the record 296 if it is a supply record, or by subtracting from the current quantity on hand the quantity specified by the record 296 if it is a demand record.

At step 522, if the quantity specified in the demand/supply record 296 is positive, meaning that the demand/supply record 296 is a supply record, the routine branches to step 524 where the record 296 is displayed as a supply record in a particular portion of the CRT screen, and the current quantity on hand is also displayed. If the demand/supply record is a demand record, it is displayed as a demand record in a different portion of the screen at step 526. At step 528, if there is another demand/supply record in the operation record, the routine branches back to step 518 so that the next demand/supply record will be displayed.

WORK CENTER VIEW

Referring back to FIG. 18, if the operator selects a work center view, the routine branches to step 540, where it is determined whether any modifications have been made by the operator. As described below, an operator may change make various modifications to the production schedule and/or plant capacity in an attempt to resolve production conflicts. After any such modifications, the work center schedules must be regenerated to take into account the modifications.

The way that the system detects whether modifications is follows. Each time the planning routine 350 is performed, which results in the generation of a new set of production records, a "modifications" flag is set to one indicating that the production records have been modified. The step 540 determines whether modifications have been made by checking the status of that "modifications" flag.

At step 540, if modifications have been made since the last generation of the work center schedules, the routine branches to step 550, where the schedules are regenerated (and the "modifications" flag is reset to zero). If no modifications have been made, step 550 is skipped.

Figure 20:
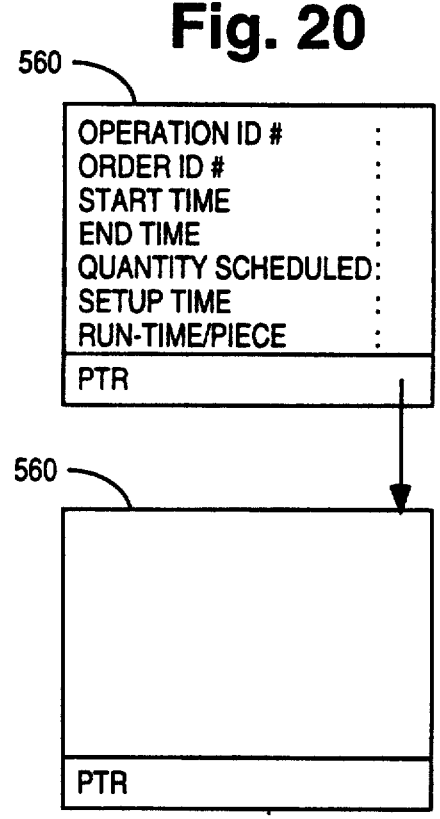
FIG. 20 is an illustration of two work center scheduling records.

When the work center schedules are generated, a work center scheduling record 560 is generated for each manufacturing operation that is to be performed. A number of work center scheduling records 560 are illustrated in FIG. 20. Each work center scheduling record 560 includes the following data: 1) the operation identification number; 2) the order identification number; 3) the time that the operation is scheduled to start; 4) the time that the operation is scheduled to end; 5) the quantity scheduled; 6) the setup time required to prepare for the operation; 7) the run-time per piece; and 8) a pointer to the next scheduling record 560.

As described above in connection with FIG. 7, each work center was assigned a home processor in accordance with the work center mapping file. Each work center scheduling record 560, which represents one manufacturing operation, is stored in the home processor for the work center where that operation is performed.

Figure 21:
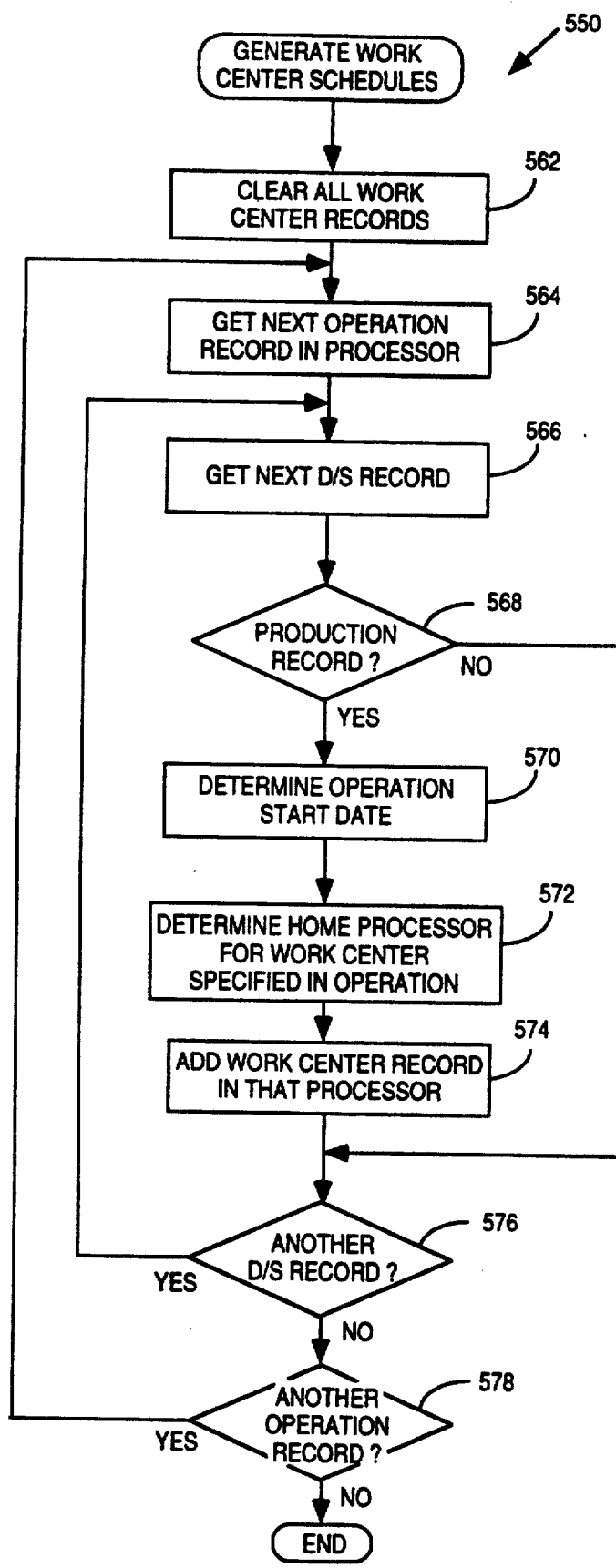

The work center scheduling records are generated in the routine 550 illustrated in FIG. 21. The scheduling routine 550 is performed simultaneously by each processor 22 in the parallel computer 12 to which a work center has been assigned. Since there are typically many more processors 22 than work centers in a manufacturing plant, it is unlikely that any processor will be assigned more than one work center.

Referring to FIG. 21, at step 562 all preexisting work center scheduling records 560 are erased. Steps 564-578 are performed for each operation record 280 in each processor 22. All operation records 280 are searched to find all demand/supply records 296 in the current demand/supply list. Any of those demand/supply records 296 that is a production record (which was generated at step 472 in FIG. 15) will cause a work scheduling record 560 to be generated.

At step 564, the next operation record 280 in the processor 22 is retrieved. At step 566, the next demand/supply record 296 in that operation record 280 is retrieved. If that demand/supply record 296 is a production record, then a manufacturing operation must be scheduled, and the routine branches to step 570 to determine when the operation should begin. The operation start date (or time) is determined in accordance with the following equation:

$$Start = Due - Setup - (Run - Time * Quantity), \quad [4]$$

where Start is the date or time the operation should start, Due is the due date on which the operation must be completed as specified in the production record, Setup is the setup time required for the operation as specified in the current operation record 280, Run-Time is the run-time per piece as specified in the operation record 280, and Quantity is the quantity that is to be produced as specified in the production record 296.

At step 572, the work center mapping records in the processors 22 are searched to determine the home processor for the work center that is specified in the operation record 280, i.e. the work center where that operation is performed. After the home processor for that work center is determined, a work center scheduling record 560 is added to the memory of that processor. Step 576 causes steps 566-574 to repeat so that a work center scheduling record 560 will be written for each production record 296 in that operation record 280. At step 578, if there is another operation record 280 in the processor, the routine branches back to step 564, and the process is repeated for that operation record.

After the scheduling routine 550 is completed, each manufacturing operation that must be performed in the plant has a corresponding work center scheduling record 560. Together, all such scheduling records constitute the production schedule for the plant.

Referring back to FIG. 18, at step 580, the routine determines whether work center load profiles have been previously generated for the current production schedule. Each time a production schedule is generated in the plan routine 350, work center load profiles must be generated to obtain the view of the load display for a single work center.

If load profiles were not previously made, then the routine branches to step 590 where a work center view is generated. The work center view is a CRT display that contains information relating to all of the scheduled manufacturing operations for a particular work center selected by the operator.

Figure 22:
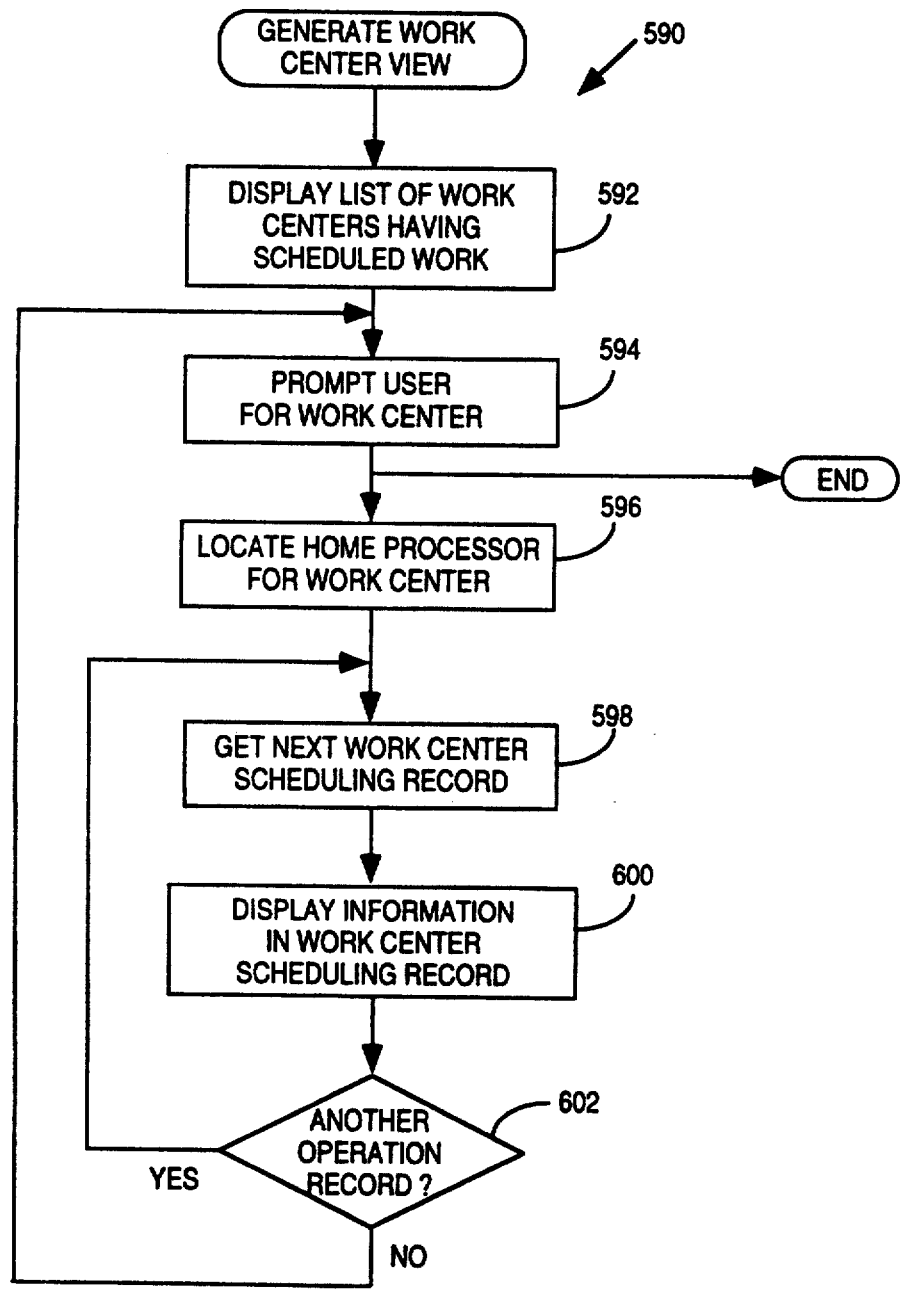

Referring to FIG. 22, a flowchart of the generate work center view routine 590 is illustrated. At step 592, each processor 22 that has been assigned a work center searches its memory to determine whether it has any work center scheduling records 560, and a list of all work centers having scheduled work is generated on the CRT display. At step 594, the operator is prompted to enter one of the displayed work centers. At this point, the operator may exit the routine, in which case the routine ends. If the operator selected a work center, the routine branches to step 596 where the home processor for the selected work center is located by searching the work center mapping records stored in the processors.

Steps 598-602 are repeated for every work center scheduling record 560 in the home processor. At step 598, the next scheduling record is retrieved, and at step 600, the information in the scheduling record is generated on the CRT display. The information can be displayed in any convenient format. At step 602, the routine branches back to step 598 if there is another scheduling record for the selected work center. If not, the routine branches back to step 594 to prompt the user for another work center selection.

LOAD VIEW FOR A SINGLE WORK CENTER

A third type of view the operator may select during the view current schedule routine 360 of FIG. 18 is a view that displays, for a single work center, the capacity of the work center and the production quantity, or load, currently scheduled at the work center. The capacity and load information is provided for each of a number of scheduling time periods in a longer time range.

Figure 23:
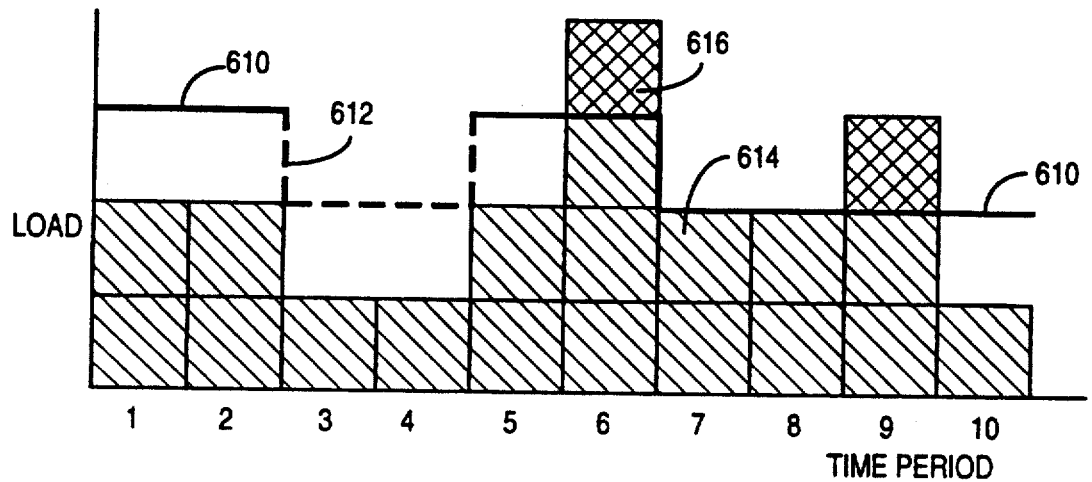
FIGS. 23 and 28 are illustrations of CRT screen displays generated during operation of the system.

This work center load view is illustrated in FIG. 23. The normal capacity of the work center is illustrated by a heavy solid line 610, and if there are any exceptions to the normal capacity, the exception capacity is illustrated as a heavy dotted line 612. The load of the work center is illustrated with cross-hatched blocks. During each time period, all blocks 614 appearing below the capacity threshold are colored green, as indicated by single cross-hatching. If the work center is overloaded during any time period, which is indicated by blocks appearing above the capacity threshold, such overload is indicated by coloring the blocks 616 red, as indicated by double cross-hatching. Because of the manner in which the display is presented, the operator can generate the work center load view for any work center and immediately determine whether there are any overloads.

Referring back to FIG. 18, when the operator selects the work center load display, the routine proceeds to a different branch of the routine 360 as indicated by an arrow 620. During branch 620, the steps 540 and 550, described above, are performed. At step 630, the load profiles for all of the work centers in which work is scheduled are generated based upon an examination of all work center scheduling records 560 in each processor 22. The step 630 is performed simultaneously by all processors having work center scheduling records.

Figure 24:
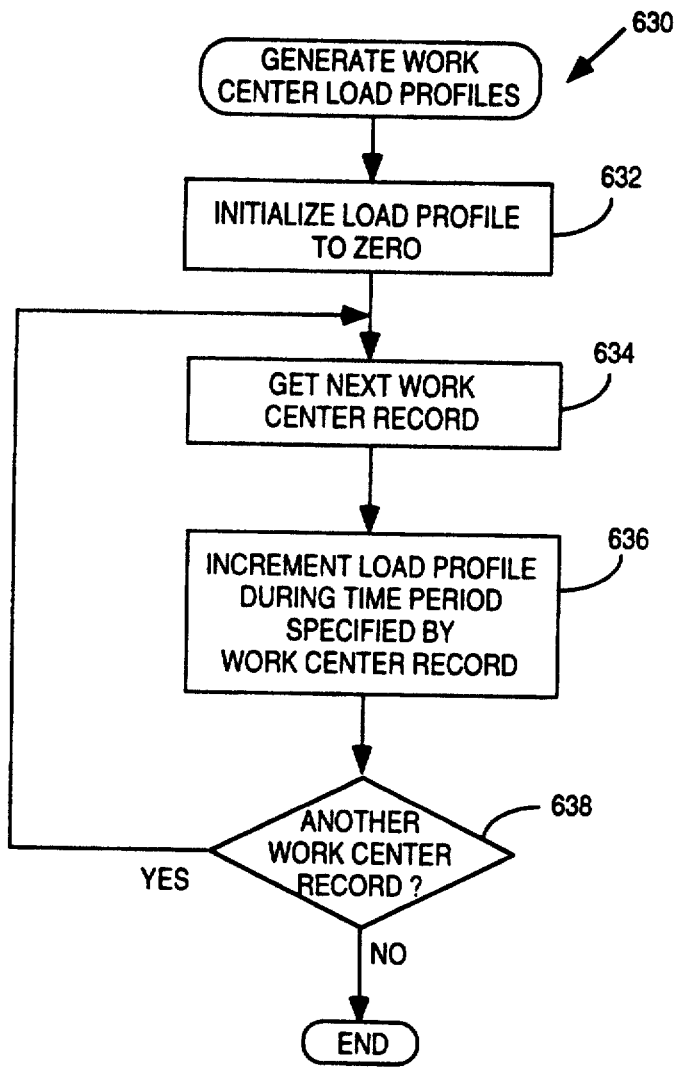

A flowchart of the step 630 is illustrated in FIG. 24. At step 632, the load profile for the work center is initialized to zero. This load profile is an array in which each entry contains a number specifying the load for a particular time period. At step 634, the next work center scheduling record 560 is retrieved. At step 636, the work center scheduling record is examined to determine which time periods production is scheduled. For each such time period, each entry in the load profile entries is incremented. For example, if the operation begins on day 3 and ends at the beginning of day 5, the two load values in the load profile for days 3 and 4 would each be incremented. At step 638, if there is another work center scheduling record 560, the routine branches back to step 634.

Referring back to FIG. 18, after the work center load profile is generated, the routine branches to step 650, where a load display, like the one shown in FIG. 23, for the selected work center is generated.

Figure 25:
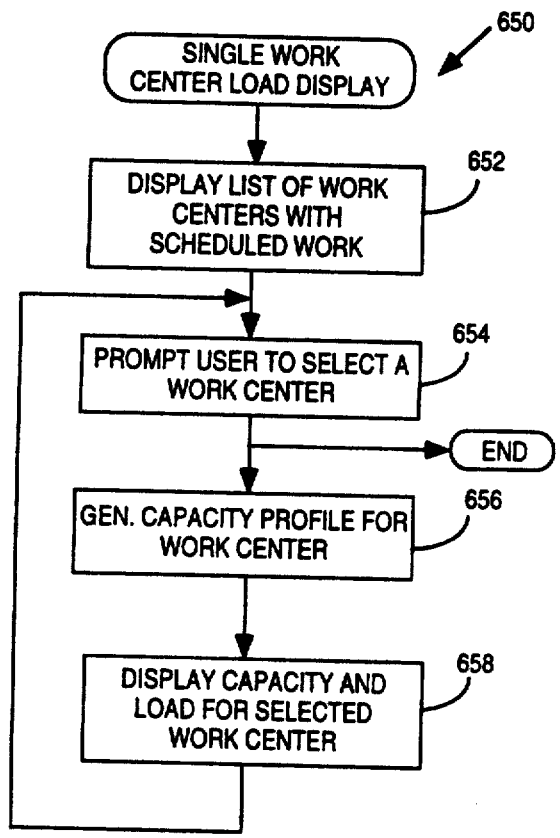

A flowchart of the step 650 is illustrated in FIG. 25. At step 652, a display of all work centers having scheduled work is generated on the CRT display. At step 654, the user is prompted to select one of the work centers. If the user selects a work center, the routine branches to step 656 where the capacity profile for the selected work center is generated. This capacity profile is shown in FIG. 23 as the solid lines 610 representing normal capacity and the dotted lines 612 representing exception capacity. At step 658, the capacity and load display, as shown in FIG. 23, for the selected work center is displayed to the operator's CRT. The routine then branches back to step 654 to prompt the operator for another work center selection.

Figure 26:
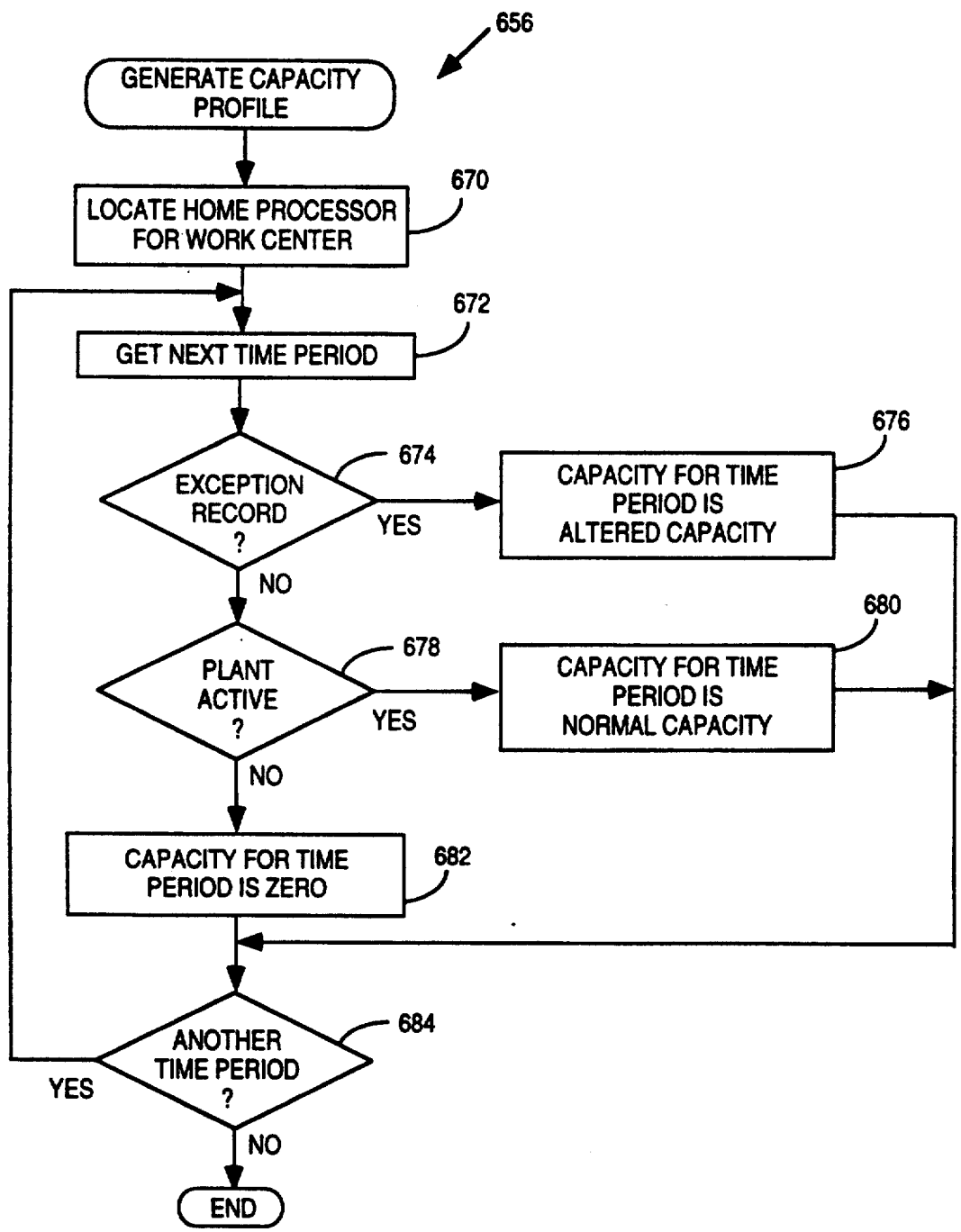

A flowchart of the generate capacity profile step 656, which is shown schematically in FIG. 25, is illustrated in FIG. 26. The capacity profile for a work center is generated from the work center capacity records 310 and exception records 312, shown in FIG. 10, that are stored in the processors 22.

Referring to FIG. 26, at step 670 the home processor for the selected work center is determined by searching the work center mapping records stored in the processors. At step 672, for the next time period, the routine searches the work center capacity records 310 to determine if there is an exception record 312 for the current time period. At step 674, if there is an exception record for that time period, the routine branches to step 676 where it sets the work center capacity for the current time period to the altered capacity specified in the exception record.

If there is no exception record for the current time period, the routine branches to step 678, where it determines whether the plant is active for the current time period. This determination is made based upon the plant status array stored in data field 76 described in connection with FIG. 4. If the plant is active for the time period, the routine branches to step 680 where the work center capacity for the current time period is set to the normal capacity specified in the work center record. If the plant is not active, the capacity for the current time period is set to zero. At step 684, if there is another time period for which capacity is to be determined, the routine branches back to step 672.

LOAD VIEW FOR MULTIPLE WORK CENTERS

Another view the operator may select is a load view for multiple work centers. This view is similar to the load view for a single work center described immediately above, but instead shows the capacity and load on a number of work centers simultaneously.

This multiple work center load view (not illustrated) appears on the operator's CRT display as a three-dimensional view, with a first horizontal axis representing the time periods, a second horizontal axis representing the work center, and a third vertical axis representing the load at a particular work center during a particular time period. The load is represented by three-dimensional blocks, which are colored green if they appear below the capacity of their associated work center and red if they appear above the work capacity. This multiple work center view is advantageous where an operator is making modifications to the production schedule that simultaneously affect a number of work centers.

Referring back to FIG. 18, if the operator selects the multiple work center load view, the routine proceeds to the branch indicated by the arrow 690, and the steps 540, 550, and 630 described above are performed. The multiple work center load view is then displayed at schematic step 700, a flowchart of which is shown in FIG. 27.

Figure 27:
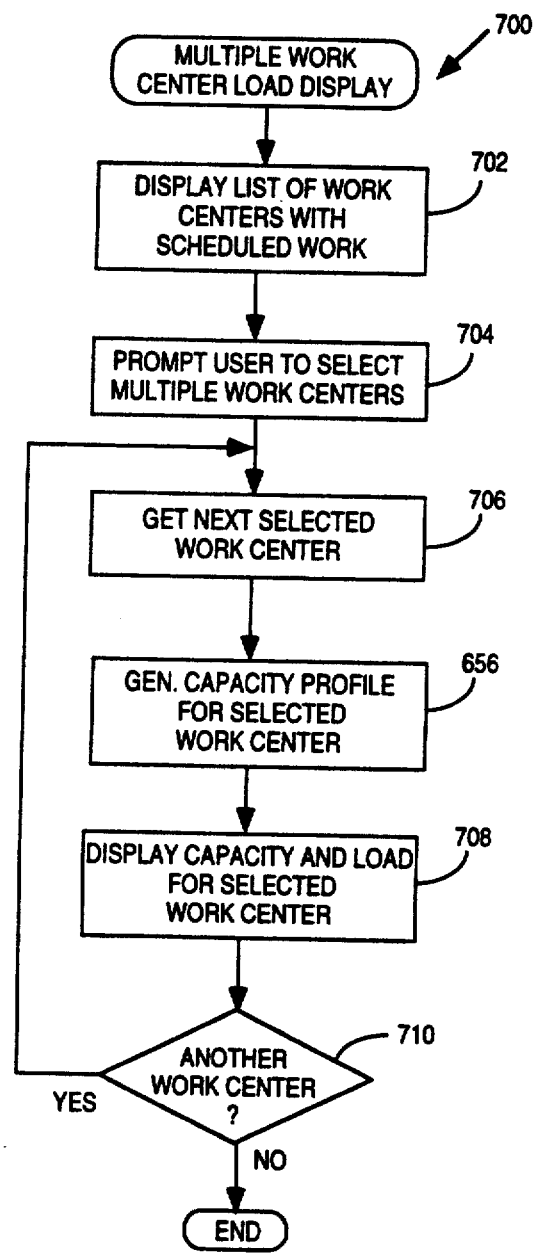

Referring to FIG. 27, at step 702 the list of work centers having scheduled work is displayed on the operator's CRT. At step 704, the operator is prompted to select a number of work centers up to a predetermined maximum number. Steps 706-710 cause the three-dimensional load display to be generated. At step 706, the next work center selected by the operator is retrieved. At step 656, the capacity profile for that work center is generated as described above in connection with FIG. 26. At step 708, a portion of the three-dimensional view is displayed by showing the capacity and load blocks for that work center. At step 710, if there is another work center selected by the operator which is to be displayed, the routine branches back to step 706.

SCHEDULING VIEW FOR AN ORDER

Figure 28:
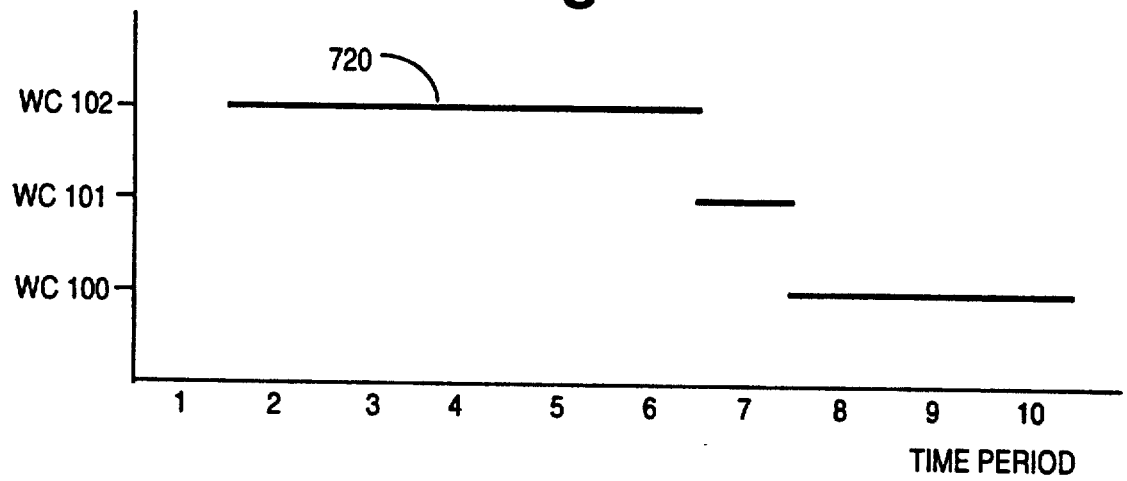

Another view generated by the system is a scheduling view for an order, typically a customer order. This scheduling view illustrates the scheduling times of all manufacturing operations scheduled in response to a particular customer order. This view is advantageous where the operator wishes to check the status of, or perhaps expedite, a particular customer order. The view, which is illustrated in FIG. 28 in greatly simplified form for only three work centers (WCs), consists of the duration of each scheduled operation, as represented by a line 720, for each work center that is scheduled to performed operations needed by the selected customer order.

Referring back to FIG. 18, in response to the operator selecting the scheduling profile for an order, the routine proceeds to the branch indicated by the arrow 730. After steps 540 and 550, the routine branches to the schematic step 740, a flowchart of which is shown in FIG. 29.

Figure 29:
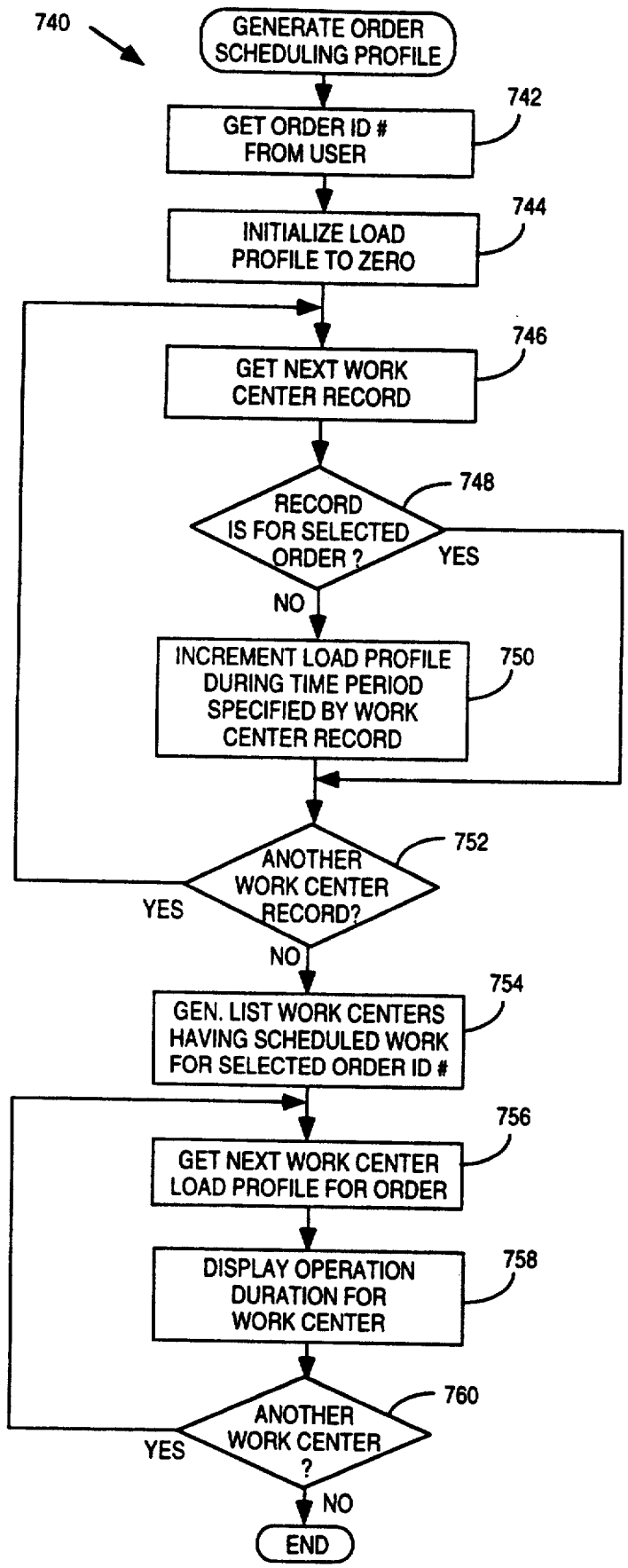

Referring to FIG. 29, at step 742 the operator is prompted for the identification number of the customer order for which the scheduling display is to be generated. Steps 744-752 are analogous to steps 632 638 of FIG. 24, except that the load profile determined in the routine of FIG. 29 only includes those work center scheduling records 560 for the customer order selected by the operator, which results from the branch step 748.

At step 754, a list of work centers having scheduled work for the selected order identification number is generated. Steps 756–760 go through the list and generate one or more portions of the display for each work center. A single work center may generate two of the lines 720 shown in FIG. 28 if the work center has work scheduled at two different times for the selected customer order. At step 756, the load profile for the next work center on the list generated in step 754 is retrieved, and at step 758 the duration of the operation(s) for that work center is displayed on the operator's CRT. If there is another work center on the list, the routine branches back to step 756.

It might be noted that the load profile generated in step 750 includes both the duration for each operation and the load value for each time period. In generating the display of FIG. 28, only the duration of the operation is necessary. The duration of the operation may be determined by generating the line 720 of FIG. 28 for any time period in the load profile having a nonzero load.

SCHEDULE/CAPACITY MODIFICATION BY THE OPERATOR

After the production schedule is generated by the parallel manufacturing system and the operator has had a chance to inspect to schedule to determine what conflicts exist, the operator may make a number of different types of modifications either to the production schedule or to the plant manufacturing capacity.

The operator may change the plant capacity by: 1) increasing the normal capacity of one or more work centers, such as by installing another machine in a work center; 2) changing the exception capacity of one or more work centers, such as by postponing scheduled maintenance; and 3) increasing the capacity of the plant overall, such as by adding a weekend manufacturing shift. The plant capacity may also be decreased in any of the above manners where the operator determines that capacity is not being used.

The operator may change the production schedule to resolve conflicts in it by: 1) changing or adding a supply record to indicate that a quantity of components can be received earlier than anticipated (after checking with the component supplier); 2) using firm planned orders to force the manufacturing system to make needed components earlier; and 3) by changing or deleting a demand record, such as where the demand records is for a demand forecast and not a customer order, to reduce the demand for the components for which there is a shortage.

The above ways of changing the plant capacity and production schedule are only intended to be exemplary and do not represent all of the possible modifications that could be made by the operator.

Any modifications that are made need to be entered into the system by changing the data contained therein. FIG. 30 is a flowchart illustrating a number of ways in which the data can be changed. The types of changes shown in FIG. 30 may be made through one or more CRT displays available to the operator, and the particular operator interface through which the changes can be made is unimportant.

Referring to FIG. 30, the operator may add a demand or supply record, delete a demand or supply record, or change a demand or supply record at steps 800, 802, 804, respectively; the operator may change the plant schedule at step 806; the operator may change the normal capacity for a work center at step 808; and the operator may add, delete or change a work center exception record at steps 810, 812, 814, respectively.

ADDING, DELETING OR CHANGING DEMAND/SUPPLY RECORDS

Figure 31:
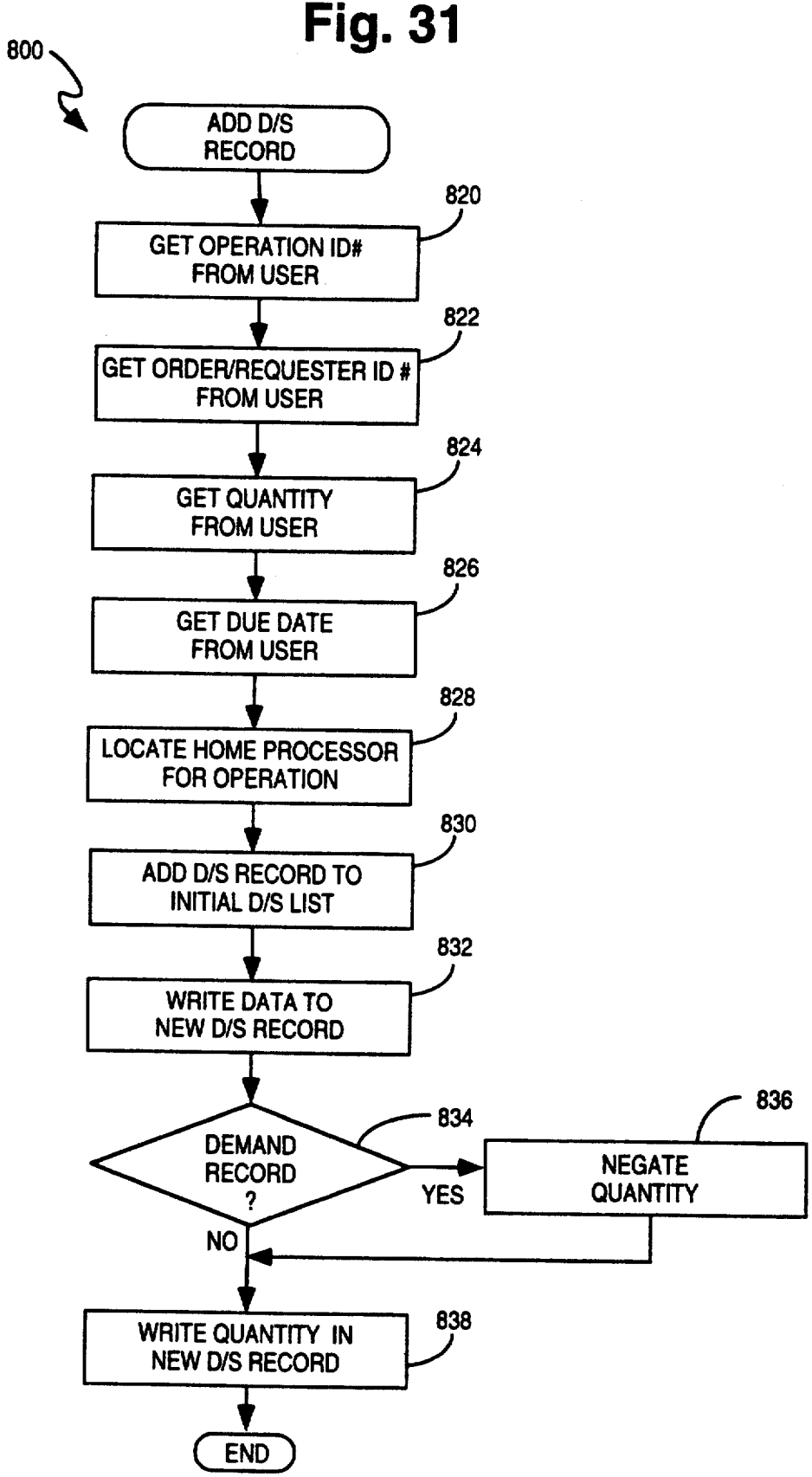

A flowchart of the add demand/supply record step 800 shown schematically in FIG. 30 is set forth in FIG. 31. Adding a demand/supply record is performed, for example, when a firm planned order is used to force earlier production of a component or when additional supplies of components are expected.

Any operator modifications of the demand/supply records are made to the records 292 in the initial demand/supply list.

Referring to FIG. 31, at step 820 the operator is prompted for the operation identification number of the demand or supply record 292 to be added to the initial demand/supply list. At step 822, if the record to be added is a supply record, the operator enters the requester identification number; otherwise the operator enters the order identification number. At step 824, operator inputs the quantity, and at step 826 the operator inputs the due date.

At step 828, the home processor for the new demand/supply record is located, based on the operation identification number entered by the operator, and at step 830, a new demand/supply record is formatted in the initial demand/supply list. At step 832, the data entered in steps 822 and 826 is written to the new demand/supply record. At step 834, if the new record is a demand record (firm planned orders are considered demand records), the routine branches to step 836 where the quantity is negated (the operator only enters the absolute value of the quantity at step 824). At step 838, the quantity is written to the new demand/supply record.

Figure 32:
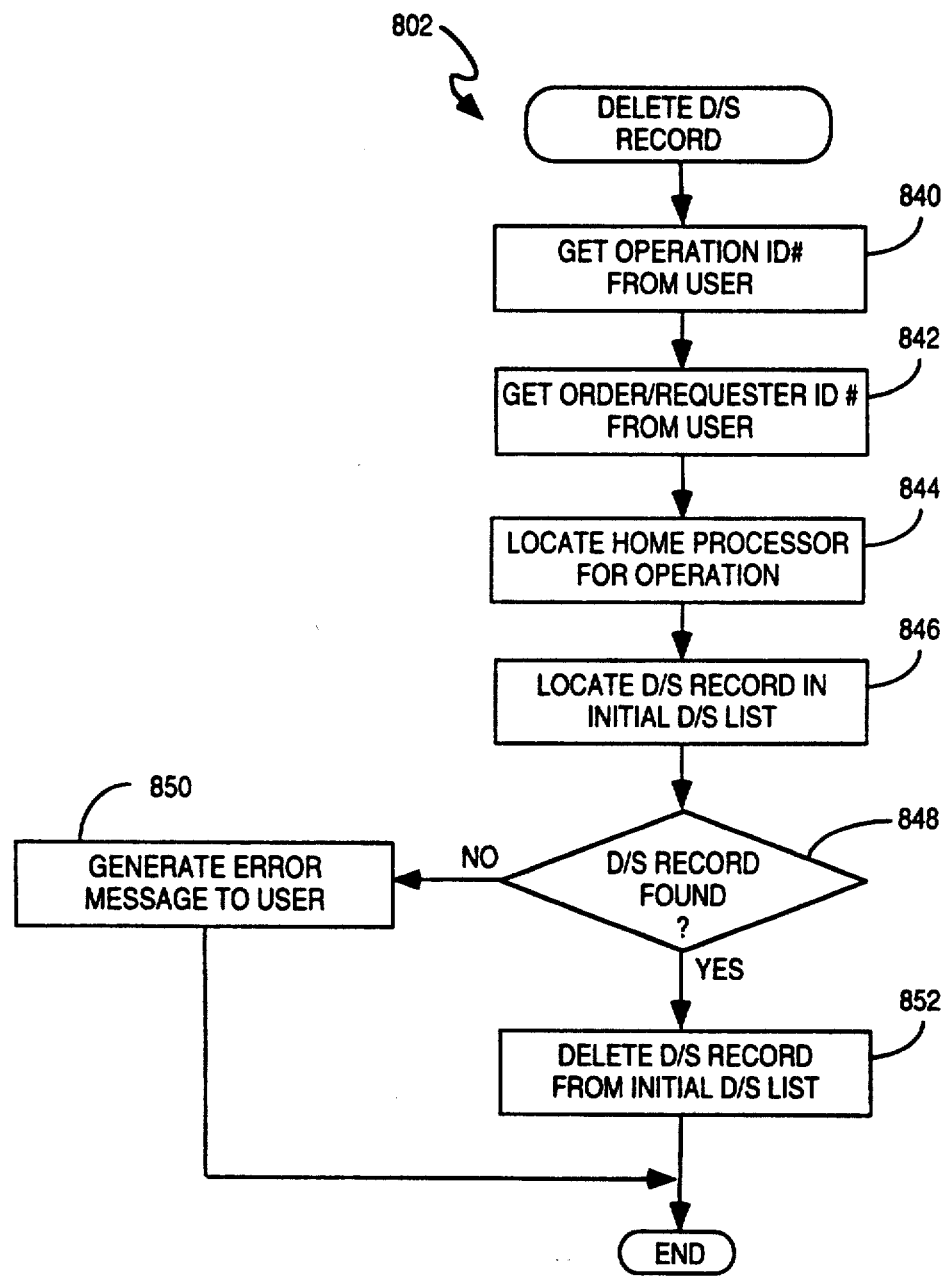

A flowchart of the delete demand/supply record step 802 shown schematically in FIG. 30 is set forth in FIG. 32. Deleting a demand/supply record 292 is performed, for example, when an expected shipment of a component is cancelled or when a customer order is cancelled.

Referring to FIG. 32, at step 840 the operation identification number of the demand/supply record to be deleted is entered by the operator. At step 842, the order or requester identification number is entered. At step 844, the home processor for the demand/supply record to the deleted is located, and at step 846 the initial demand/supply list is searched for the demand/supply record. At step 848, if the record is not found, the routine branches to step 850 where an error message is displayed to the operator that the selected demand/supply record does not exist. If the demand/supply record is found, the routine branches to step 852 where it is deleted from the initial demand/supply list.

Figure 33:
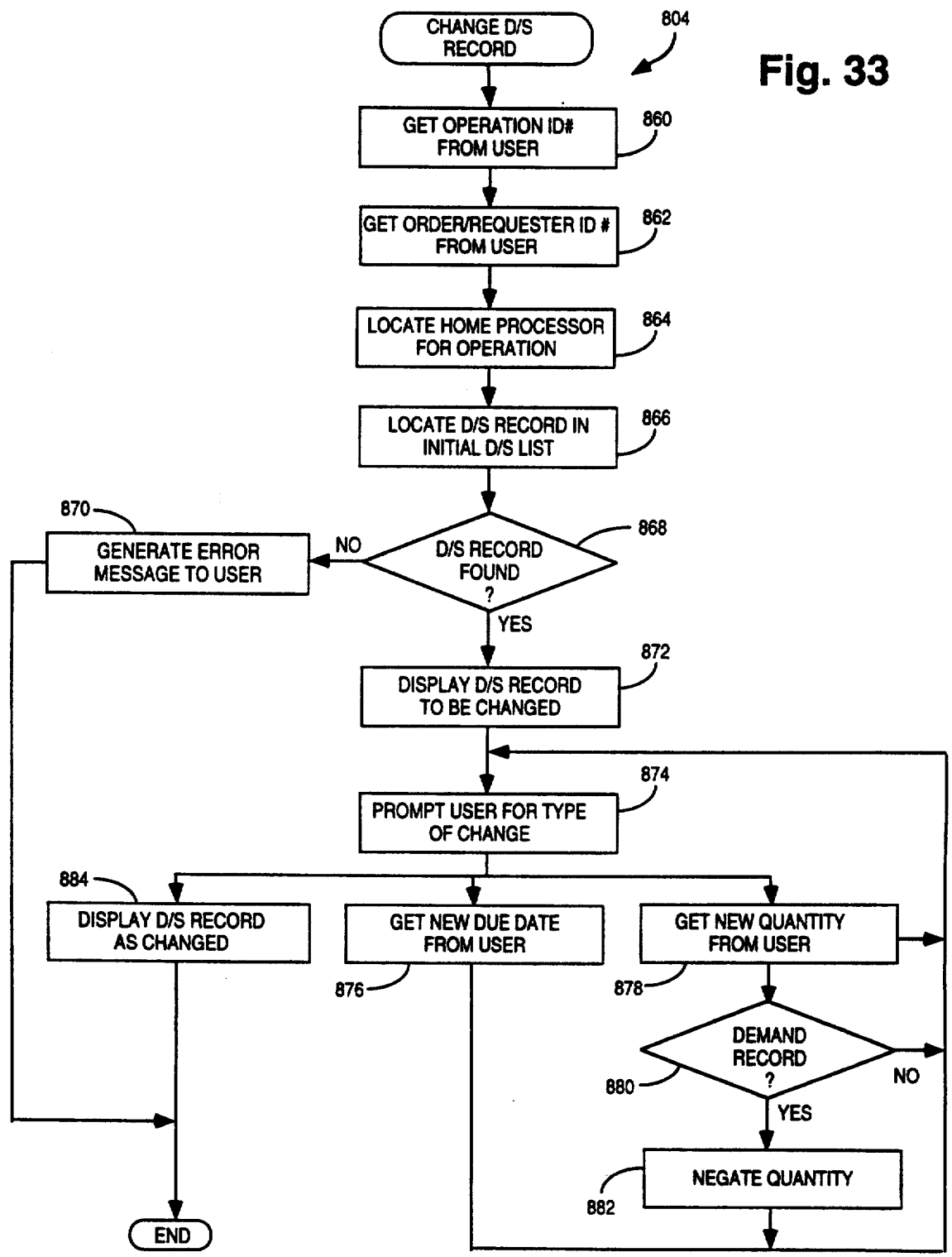

A flowchart of the change demand/supply record step 804 shown schematically in FIG. 30 is set forth in FIG. 33. Changing a demand/supply record 292 is performed, for example, when a quantity of components can be shipped to the plant earlier than expected or when a customer order needs to be filled earlier.

Referring to FIG. 33, steps 860–870 are analogous to steps 840–850, and their description is not repeated. At step 872, after the demand/supply record to be changed has been retrieved, it is displayed to the operator's CRT screen. At step 874, the operator is prompted for the type of change to be made. If the operator selects the due date for modification, the routine branches to step 876 where the new due date is entered. If the operator selects the quantity for modification, the routine branches to step 878 where the new quantity is input, and negated at step 882 if it is a demand record as determined at step 880. After the operator has finished making the changes, the routine branches to step 884 where the demand/supply record as changed is displayed on the operator's CRT.

CHANGING THE PLANT STATUS

As described above in connection with the plant status data field 76 shown in FIG. 4, the plant status is an array of binary values, representing either that the plant is operating or not operating, for a number of time periods, such as days or 8-hour shifts. Changing the plant status is performed, for example, when shifts are added or deleted.

Figure 34:
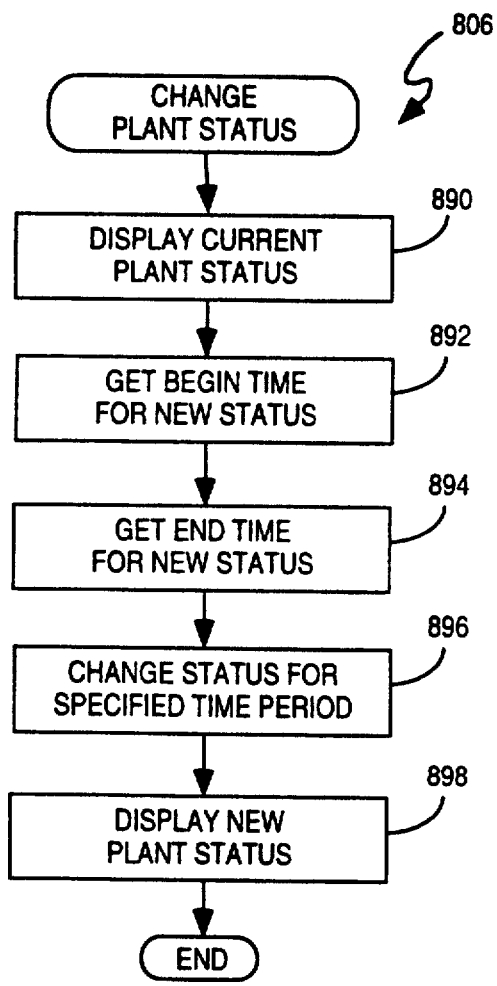

A flowchart of the change plant status step 806 shown schematically in FIG. 30 is set forth in FIG. 34. Referring to FIG. 34, at step 890 the current status of the plant is displayed on the operator's CRT. At step 892, the operator is prompted for the begin time for the new status, and at step 894 the operator is prompted for the end time of the new status. At step 896, the routine changes the status for the time period specified by the operator, and at step 898 the new plant status is displayed.

CHANGING THE NORMAL WORK CENTER CAPACITY

Figure 35:
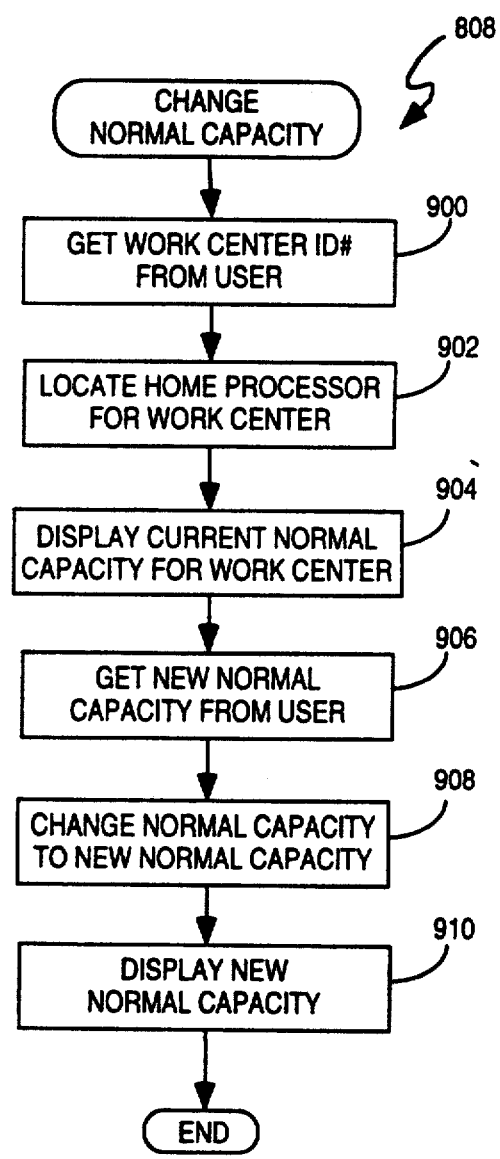

A flowchart of the change normal work center capacity step 808 shown schematically in FIG. 30 is set forth in FIG. 35. Referring to FIG. 35, at step 900 the operator is prompted for the work center identification number for which the normal capacity is to be changed. At step 902, the home processor for the selected work center is located via the work center mapping records in the processors, and at step 904 the normal capacity for the selected work center is retrieved from the work center capacity record 310 and displayed on the operator's CRT. At step 906, the operator is prompted for the new capacity. At step 908 the current normal capacity in the capacity record 310 is changed to the new normal capacity specified by the operator, and at step 910 the new normal capacity is displayed.

ADDING, DELETING OR CHANGING AN EXCEPTION RECORD

Figure 36:
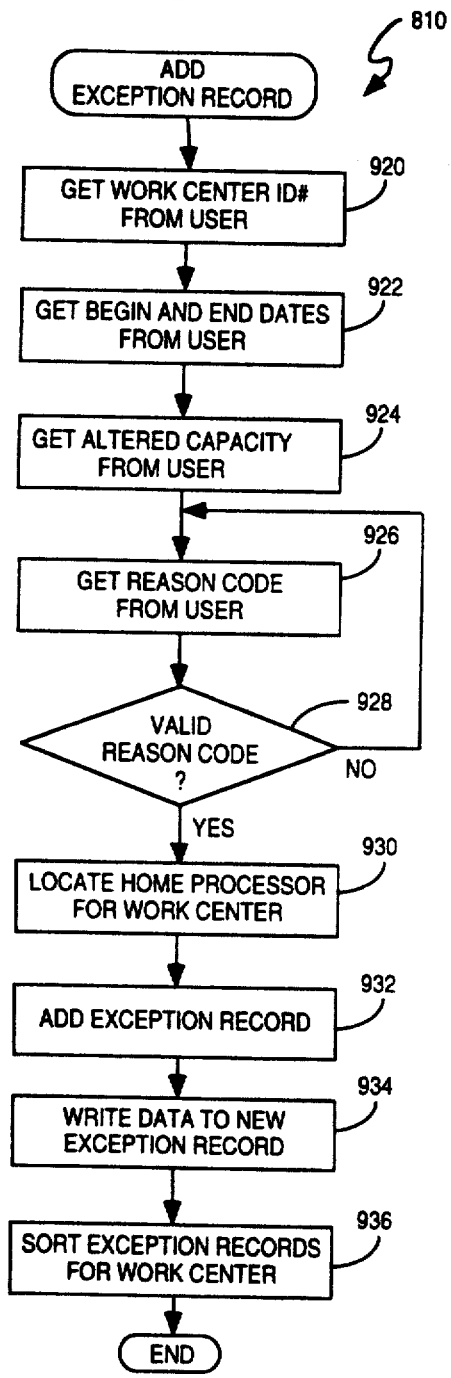

A flowchart of the add exception record step 810 shown schematically in FIG. 30 is set forth in FIG. 36. Referring to FIG. 36, at step 920 the operator is prompted for the identification number of the work center for which an exception record 312 is to be added. At step 922, the operator is prompted for the begin and end dates of the new exception record, and at step 924 the operator is prompted for the altered capacity that will exist between the specified begin and end dates. At step 926, the operator is prompted to enter a code indicating the reason for the altered capacity.

Assuming the reason code is valid as determined at step 928, the routine branches to step 930 where it locates the home processor for the work center for which the exception record is to be added. At step 932, a new exception record format is added to the work center record in the home processor. At step 934, the data entered by the operator at steps 922-926 is written to the new exception record. At step 936, all of the exception records for the work center are sorted by putting the begin dates specified in the exception records in chronological order.

Figure 37:
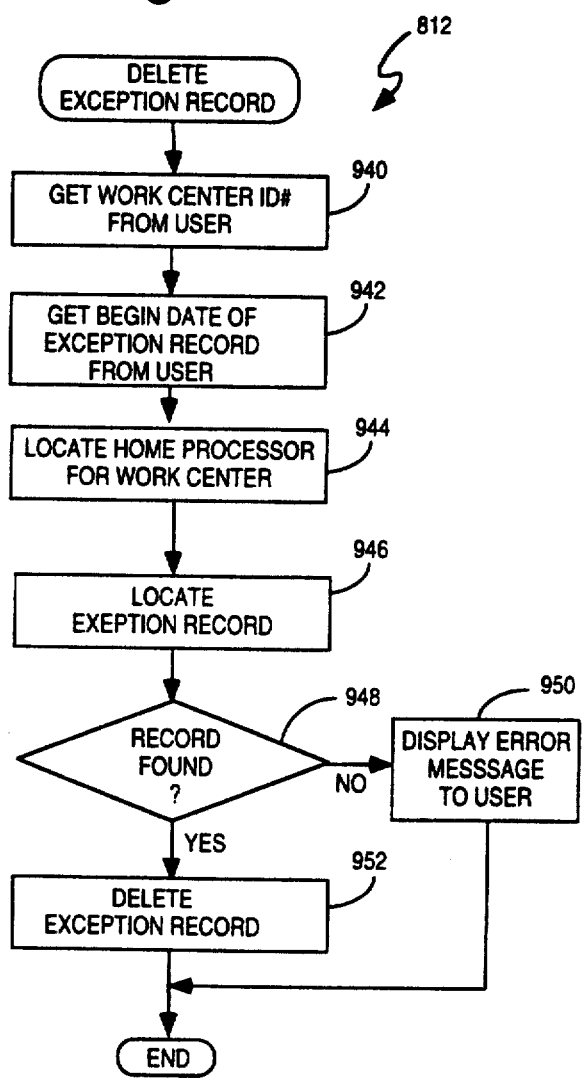

A flowchart of the delete exception record step 812 shown schematically in FIG. 30 is set forth in FIG. 37. Referring to FIG. 37, at step 940 the operator is prompted for the identification number of the work center for which an exception record is to be deleted. At step 942, the operator is prompted for the begin date of the exception record to be deleted. The begin date uniquely identifies the exception record since no two exception records can have the same begin date. At step 944, the routine locates the home processor for the work center. At step 946, the exception record to be deleted is located by searching for the exception record in the processor having the specified begin date. If the exception record to be deleted is not found, the routine branches to step 950 where an error message is displayed on the operator's CRT. If the exception record was found, it is deleted at step 952.

A flowchart of the change exception record step 814 shown schematically in FIG. 30 is set forth in FIG. 38. Referring to FIG. 38, steps 960-970 are the same as steps 940-950 and the description of them is thus not repeated. At step 972, after the exception record to be changed is located, it is displayed on the operator's CRT, and at step 974 the operator is prompted for the type of change to be made. The operator may change the begin date, the end date, the altered capacity, and/or the reason code in steps 976, 978, 980, and 982 respectively. After the operator has made all desired changes, the routine branches to step 984 where the exception record as changed is displayed on the operator's CRT. At step 986, the exception records are chronologically sorted by their begin dates.

SAVING AND RETRIEVING PRODUCTION SCHEDULES

After making a number of modifications to the current production schedule and/or plant capacity, the operator would normally invoke the planning function of step 350 again (FIG. 8b), and then perform the view current schedule routine 360 to inspect the modified production schedule. At any time, the operator may save one or more production plans to optimize the production schedule. For example, after the operator has achieved an acceptable schedule, that schedule may be saved, and the operator may make additional modifications to achieve an even better schedule. If no better schedule can be obtained through various modifications, the original schedule may be retrieved and used. Alternatively, the operator may save a number of production schedules and retrieve the best one at a later time.

A flowchart of the save/retrieve production schedule step 380, shown schematically in FIG. 8b, is illustrated in FIG. 39. At step 990, the operator is prompted for an alphanumeric name identifying the production schedule to be saved or retrieved. At step 992, the operator is prompted to determine for the desired action, i.e. either to save or retrieve a schedule. At step 994, if the current production schedule is to be saved, the routine branches to step 996, where all the data relating to the current production schedule is saved to the massively parallel disk array 24. This data includes the work center capacity and exception records, data relating to the plant status, and the demand/supply records 292 in the initial list. The demand/supply records 296, which include production records, and the work center scheduling records 560 are not saved, but are simply regenerated from the saved initial demand/supply records 292 during the plan routine 350.

If the operator requested that a production schedule be retrieved, the routine branches to step 998, where the data relating to the production schedule having the name entered by the operator in step 990 is retrieved from the parallel disk array 24. To regenerate the plant schedule from this data, the operator invokes the plan routine 350.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A parallel manufacturing system for use in connection with a manufacturing plant, said manufacturing system comprising:
    memory means for storing manufacturing data representing the relationship between at least one product and a number of components necessary for the manufacture of said product, each of a plurality of said components being produced by a respective manufacturing operation;
    parallel processing means coupled to said memory means, said parallel processing means having at least 100 processors capable of substantially simultaneous parallel operation, said parallel processing means comprising:
      means for determining the number of each of said components that must be manufactured to produce a quantity of said product; and
      means for determining when each of said manufacturing operations should begin; and
    means coupled to said memory means for assigning said manufacturing data stored in said memory means among said processors in said parallel processing means.

2. A parallel manufacturing system as defined in claim 1 wherein said parallel processing means includes at least 1,000 processors capable of parallel operation.

3. A parallel manufacturing system as defined in claim 1 wherein said for determining the number of each of said components that must be manufactured to produce said quantity of said product comprises:
    means for determining whether a quantity on hand for each of said components exceeds a demand quantity for each of said components.

4. A parallel manufacturing system as defined in claim 1 wherein said quantity of said product is the difference between a quantity of said product in inventory and a quantity of said product for which orders have been received.

5. A parallel manufacturing system as defined in claim 1 wherein said means for determining when said manufacturing operations should begin determines the date on which each of said manufacturing operations should begin.

6. A parallel manufacturing system as defined in claim 5 wherein said means for determining when said manufacturing operations should begin determines the time at which each of said manufacturing operations should begin.

7. A parallel manufacturing system as defined in claim 1 wherein said manufacturing data comprises data representing a relational tree for each of a plurality of products made by the manufacturing plant.

8. A parallel manufacturing system as defined in claim 7 wherein each of said relational trees includes data representing the relationship between a product, all manufacturing operations necessary for the manufacture of said product, and all components necessary for the manufacture of said product.

9. A parallel manufacturing system as defined in claim 7 wherein said means for assigning said manufacturing data among said parallel processors assigns the data representing each of said relational trees to a plurality of said parallel processors.

10. A parallel manufacturing system comprising:
    a memory that stores manufacturing data representing the relationship between at least one product and a number of components necessary for the manufacture of said product, each of a plurality of said components being produced by a respective manufacturing operation;
    a parallel computer coupled to said memory, said parallel computer having at least 100 processors capable of parallel operation, said parallel computer determining the number of each of said components that must be manufactured to produce a quantity of said product and determining when each of said manufacturing operations should begin; and
    an assignment module that assigns said manufacturing data stored in said memory among said processors in said parallel computer.

11. A parallel manufacturing system as defined in claim 10 wherein said parallel computer comprises at least 1,000 parallel processors.

12. A parallel manufacturing system as defined in claim 11 wherein said assignment module comprises a computer program routine stored in said parallel computer.

13. A parallel manufacturing system as defined in claim 12 wherein said quantity of said product is the difference between a quantity of said product in inventory and a quantity of said product for which orders have been received.

14. A parallel manufacturing system as defined in claim 12 wherein said manufacturing data representing the relationship between said product and said components comprises operation data relating to the manufacturing operations that are performed in the manufacture of said product.

15. A parallel manufacturing system as defined in claim 14 wherein said operation data includes operation data records, each of which corresponds to a respective manufacturing operation necessary for the manufacture of said product.

16. A method for use in a manufacturing plant, said method comprising the steps of:
    (a) generating manufacturing data representing the relationship between a product and number of components used in the manufacture of said product;
    (b) distributing said manufacturing data generated in said step (a) among a plurality of parallel processors in a massively parallel computer; and (c) using said manufacturing data to determine the number of said components that must be manufactured to produce a quantity of said product.

17. A method as defined in claim 16 wherein each of said steps (a)–(c) is performed substantially simultaneously by each of said parallel processors in said massively parallel computer system.

18. A method for use in a manufacturing plant, said method of comprising the steps of:
   (a) generating manufacturing data relating to the relationship between a product and a number of components used in the manufacture of said product;
   (b) generating demand data relating to a quantity of said product that is needed;
   (c) generating supply data relating to a quantity of said product that is on hand;
   (d) distributing said manufacturing data, said demand data and said supply data generated in said steps (a)–(c) among a plurality of parallel processors in a massively parallel computer; and
   (e) determining a quantity of components needed to manufacture said quantity of said product by comparing said demand data generated in said step (b) with said supply data generated in said step (c).

19. A method as defined in claim 18 wherein said manufacturing data includes operation data for each manufacturing operation used in the manufacture of said product.

20. A method as defined in claim 19 wherein said operations data includes component data relating to any components that are used in the operation corresponding to said operation data.

21. A method as defined in claim 18 additionally comprising the step of:
   (f) automatically generating demand data relating to a quantity of at least one component used in the manufacture of said product when said quantity of said product that is needed as reflected by said demand data exceeds said quantity of said product that is on hand as reflected by said supply data.

22. A method as defined in claim 18 wherein said manufacturing data represents a relational tree for said product, said relational tree having a plurality of tree levels including a highest level, a lowest level, and at least one intermediate level, and wherein said step (e) comprises the steps of:
   (f) beginning with said highest level in said relational tree, determining a number of components required in said highest level by comparing demand data for said highest-level components with supply data for said highest-level components;
   (g) for an intermediate level in said relation tree, determining a number of components required in said intermediate level by comparing demand data for said intermediate-level components with supply data for said intermediate-level components; and
   (h) repeating said step (g) until a number of components required in said lowest level in said tree has been determined.

23. A method as defined in claim 22 additionally comprising the step of:
   (i) automatically generating demand data when a needed quantity of a component corresponding to one of said levels as reflected by said demand data exceeds a quantity of hand of said component of said one of said levels as reflected by said supply data.

24. A method for use in a manufacturing plant, said method comprising the steps of:
   (a) generating manufacturing data representing the relationship between a product and a number of components used in the manufacture of said product;
   (b) distributing said manufacturing data generated in said step (a) among a plurality of parallel processors in a massively parallel computer;
   (c) using said manufacturing data to determine a number of said components that must be manufactured to produce a quantity of said product;
   (d) generating a visual display relating to said number of said components that must be manufactured as determined in said step (c);
   (e) modifying said manufacturing data in response said visual display generating is said step (d); and
   (f) repeating said steps (c)–(e) with said modified manufacturing data until a satisfactory manufacturing plan is achieved.

25. A method as defined in claim 24 additionally comprising the step of (g) saving said satisfactory manufacturing plan to a memory after the final repetition of said step (f).

26. A method for use in a manufacturing plant, said method comprising the steps of:
   (a) generating manufacturing data representing the relationship between a product and a number of components used in the manufacture of said product;
   (b) distributing said manufacturing data generated in said step (a) among a plurality of parallel processors in a massively parallel computer; and
   (c) using said manufacturing data to determine when all manufacturing operations that produce any components that must be manufactured to produce a quantity of said product should be performed.

27. A method as defined in claim 26 wherein the dates on which all manufacturing operations should be performed during said step (c) are specified.

28. A method as defined in claim 26 wherein said manufacturing data comprises a plurality of operation data records, each of which relates to an operation that is performed in the manufacture of said product, each said operation data record including:
   1) an identification number for said operation; and
   2) an identification number for each operation that produces a component that is used in said operation.

29. A method as defined in claim 28 wherein said manufacturing data that relates to components used in the manufacturing of said product comprises data relating to the operations that produce said components.

30. A method of processing as defined in claim 26 wherein said manufacturing data is distributed among said parallel processors during said step (b) in accordance with a mapping table.

31. A method of processing data as defined in claim 30 wherein said mapping table is distributed among said parallel processors.

32. A method for use in the manufacture of at least one product in a manufacturing plant, comprising the steps of:
   (a) generating manufacturing data representing a number of manufacturing operations necessary in the manufacture of said product, said operations generating a number of components, said step (a) comprising the steps of:

(a1) determining said manufacturing operations that are necessary in the manufacture of said product;
(a2) determining said components that are generated by said operations of said step (a1);
(a3) determining a number of manufacturing operations in which said components of said step (a2) are needed;
(a4) generating said manufacturing data to represent the relationship between said operations of said step (a1) and said operations of said step (a3);

(b) assigning said manufacturing data generating during said step () to a plurality of parallel processors; and
(c) determining a time schedule for said operations of said step (a1) utilizing said parallel processors.

33. A method as defined in claim 32 wherein said manufacturing data is assigned to at least 100 parallel processors during said step (b).

34. A method as defined in claim 32 wherein said manufacturing data is assigned to at least 1,000 parallel processors during said step (b).

* * * * *

UNITED STATES PATENT AND TRADEMARK OFFICE
CERTIFICATE OF CORRECTION

PATENT NO. : 5,285,392

DATED : February 8, 1994

INVENTOR(S) : Kyle, et al.

It is certified that error appears in the above-identified patent and that said Letters Patent is hereby corrected as shown below:

Column 15, line 16, please delete "account for a number of circumstances, including:" after "1)".

Column 19, line 57, please insert --where Due is the date on which the component must be-- before "manufactured".

Column 20, line 47, please delete "cause" and substitute therefor --causes--.

Column 32, line 63, please insert --a-- after "and".

Column 33, line 31, please delete "operations" and substitute therefor --operation--.

Column 33, line 53, please delete "relation" and substitute therefor --relational--.

Column 36, line 1, please delete "generating" and substitute therefor --generated--.

Column 36, line 2, please delete "()" and substitute therefor --(a)--.

Signed and Sealed this

Twenty-third Day of August, 1994

Attest:

BRUCE LEHMAN

*Attesting Officer*  *Commissioner of Patents and Trademarks*